United States Patent
Doetterl et al.

(10) Patent No.: US 11,415,192 B2
(45) Date of Patent: Aug. 16, 2022

(54) SPRING PACKAGE WITH STAMPED AND BENT SUPPORTING RING

(71) Applicant: SCHERDEL INNOTEC Forschungs—und Entwicklungs-GmbH, Marktredwitz (DE)

(72) Inventors: Peter Doetterl, Waldersdorf (DE); Franz Andritzky, Waldsassen (DE); Alexander Schraml, Marktredwitz (DE)

(73) Assignee: SCHERDEL INNOTEC FORSCHUNGS-UND ENTWICKLUNGS-GMBH, Marktredwitz (DE)

( * ) Notice: Subject to any disclaimer, the term of this patent is extended or adjusted under 35 U.S.C. 154(b) by 112 days.

(21) Appl. No.: 16/701,980

(22) Filed: Dec. 3, 2019

(65) Prior Publication Data

US 2020/0191223 A1 Jun. 18, 2020

(30) Foreign Application Priority Data

Dec. 4, 2018 (DE) ...................... 10 2018 130 880.9

(51) Int. Cl.
| | |
|---|---|
| *F16F 3/04* | (2006.01) |
| *B21D 22/02* | (2006.01) |
| *F16D 127/02* | (2012.01) |

(52) U.S. Cl.
CPC ................ *F16F 3/04* (2013.01); *B21D 22/02* (2013.01); *F16D 2127/02* (2013.01);
(Continued)

(58) Field of Classification Search
CPC ................. F16F 3/04; F16F 2224/0208; F16F 2226/047; F16F 2230/0005; F16D 2127/02; B21D 22/02
(Continued)

(56) References Cited

U.S. PATENT DOCUMENTS

| 4,756,070 A | * | 7/1988 | Takeuchi | ............... B23P 11/005 |
| | | | | 267/179 |
| 4,756,071 A | * | 7/1988 | Takeuchi | ............... B23P 11/005 |
| | | | | 267/179 |

(Continued)

FOREIGN PATENT DOCUMENTS

| CN | 1575914 A | 2/2005 |
| DE | 1038833 B | 9/1958 |

(Continued)

OTHER PUBLICATIONS

English language Abstract of DE102017128640.
(Continued)

*Primary Examiner* — Xuan Lan Nguyen
(74) *Attorney, Agent, or Firm* — Ware, Fressola, Maguire & Barber LLP

(57) ABSTRACT

The present invention relates to a spring package (2) for use in a clutch and/or in a transmission, comprising a first supporting ring (4), a second supporting ring (6) which is arranged spaced apart (parallel) from the first supporting ring (4) in the axial direction, and a plurality of coil springs (8) arranged between the first supporting ring (4) and the second supporting ring (6) in distributed manner across the circumference thereof, wherein at least one of the supporting rings (4, 6) is formed from a sheet-metal strip (22) which is stamped and then bent into a ring shape and the ends of which are permanently connected to each other. Furthermore, the invention also relates to a method for producing a supporting ring (4, 6) for a spring package (2) according to
(Continued)

the invention, comprising the following steps: stamping a sheet-metal strip (22) of predetermined length (l) and predetermined width (b), introducing spring holders (10; 68), introducing impressions on a longitudinal edge (26) of the sheet-metal strip (22) while forming a ring shape; and connecting the two axial ends.

4 Claims, 40 Drawing Sheets

(52) U.S. Cl.
CPC . *F16F 2224/0208* (2013.01); *F16F 2226/047* (2013.01); *F16F 2230/0005* (2013.01)

(58) Field of Classification Search
USPC ........................................ 188/166, 71.4, 71.5
See application file for complete search history.

(56) References Cited

U.S. PATENT DOCUMENTS

| | | | | |
|---|---|---|---|---|
| 5,306,086 | A * | 4/1994 | Orlowski | F16F 3/04 |
| | | | | 192/89.26 |
| 5,992,834 | A * | 11/1999 | Dover | F16D 13/52 |
| | | | | 188/72.3 |
| 6,575,439 | B1 * | 6/2003 | Costello | F16F 1/128 |
| | | | | 267/179 |
| 6,964,412 | B2 * | 11/2005 | Costello | F16B 21/071 |
| | | | | 267/179 |
| 7,357,381 | B2 | 4/2008 | Wakamori et al. | |
| 11,041,536 | B2 * | 6/2021 | Uematsu | F16F 3/04 |
| 2014/0110214 | A1 * | 4/2014 | McFarland | F16D 25/12 |
| | | | | 192/109 F |
| 2014/0225318 | A1 | 8/2014 | Takeda et al. | |
| 2018/0156283 | A1 * | 6/2018 | Deneszczuk | F16D 25/0638 |

FOREIGN PATENT DOCUMENTS

| | | | |
|---|---|---|---|
| DE | 102006028512 A1 | 12/2007 | |
| DE | 102017128640 A1 | 6/2018 | |
| EP | 0765101 A2 | 3/1997 | |
| JP | S62147137 A | 7/1987 | |
| JP | 05-087348 U | 11/1993 | |
| JP | 2003247579 A | 9/2003 | |
| WO | 2017/204098 A1 | 11/2017 | |
| WO | WO-2018143071 A1 * | 8/2018 | ............. F16F 1/128 |

OTHER PUBLICATIONS

English language Abstact not available for DE1038833.
English language Abstract of DE 102006028512.
English language Abstact of JPS62147137A.
English language Abstact of WO2017/204098A1.
English language Abstract of JP2003247579A.
English translation of JP05-087348U.

* cited by examiner

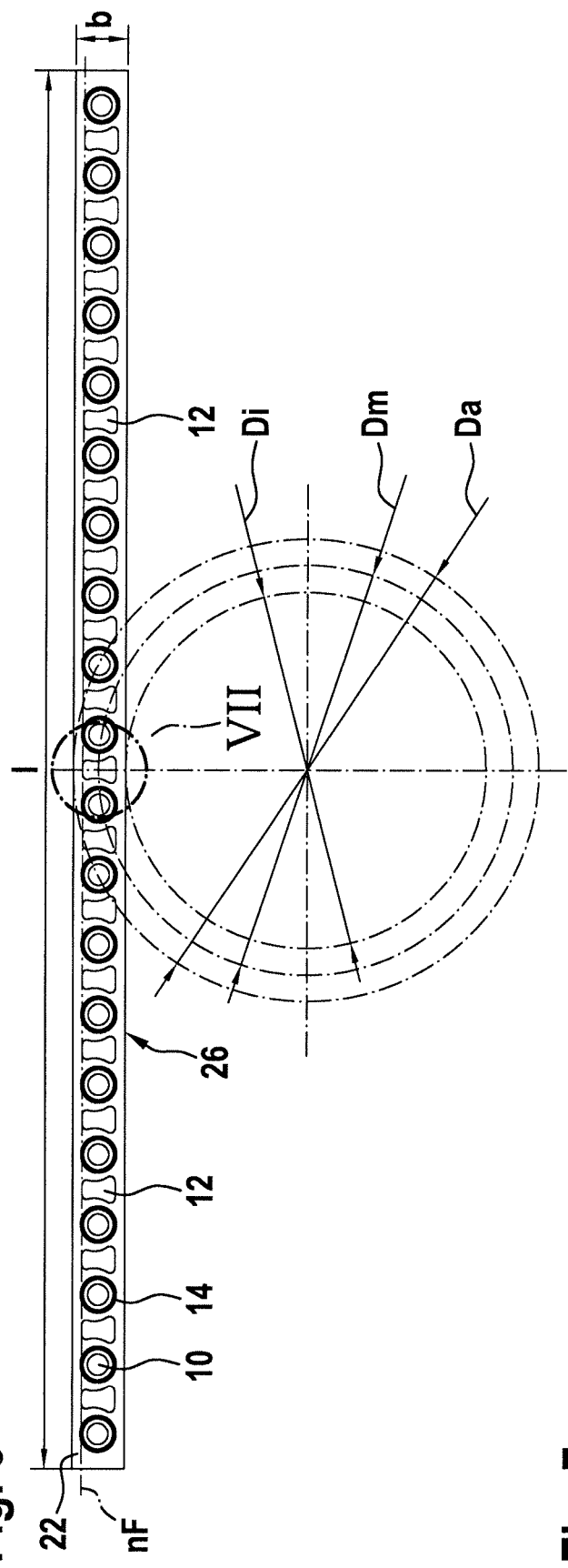
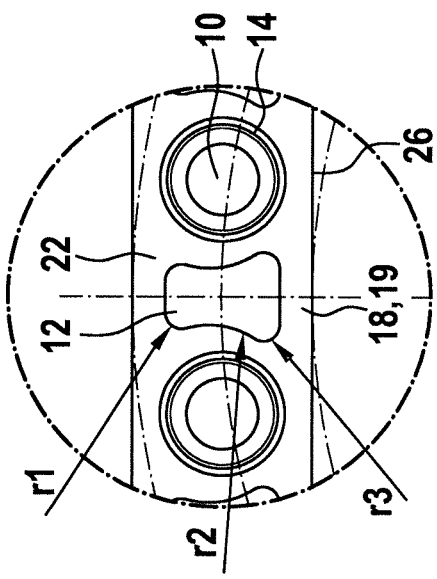

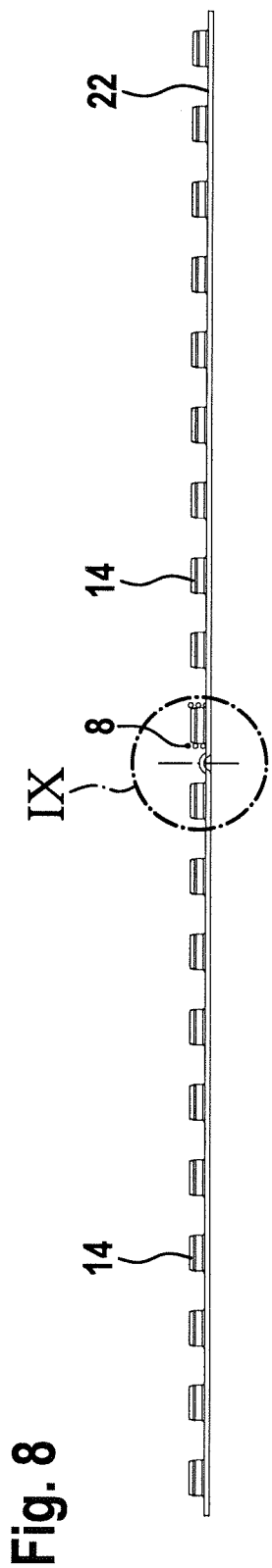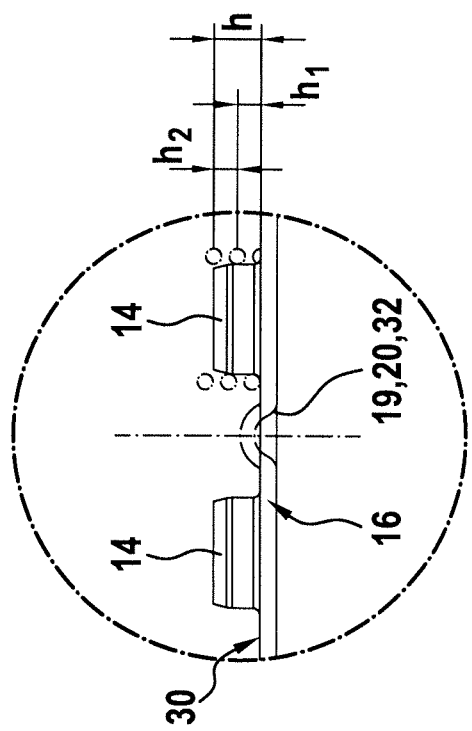

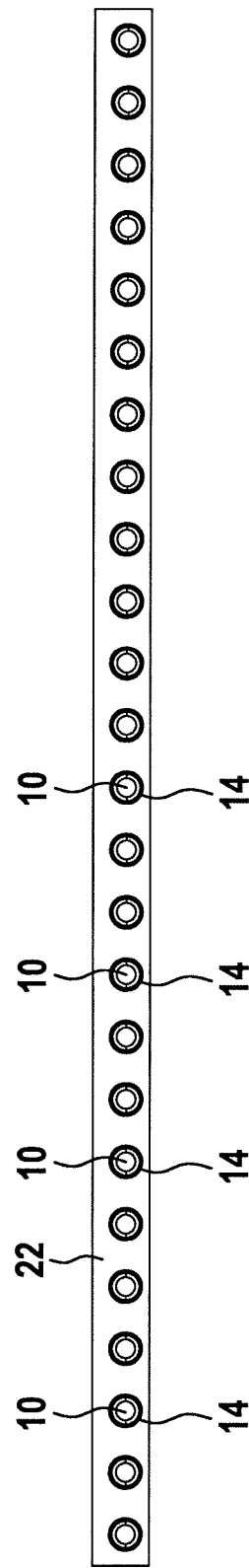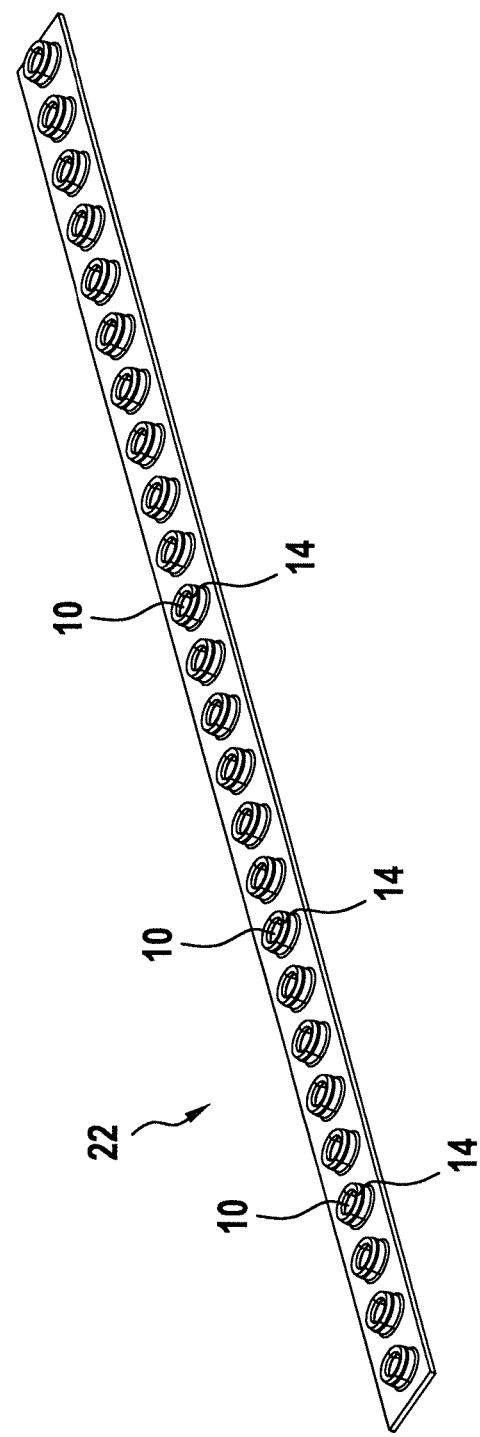
Fig. 50
Fig. 51

SPRING PACKAGE WITH STAMPED AND BENT SUPPORTING RING

The present invention relates to a spring package for use as a restoring element for multi-plate clutches and applications with similar functions in a clutch and/or a transmission, comprising a first supporting ring and a second supporting ring arranged in axially spaced apart manner parallel to the first supporting ring, and a plurality of coil springs arranged between the first supporting ring and the second supporting ring in substantially uniformly distributed manner across the circumference thereof. The invention also relates to a method for producing a supporting ring.

Rings made of sheet metal and the production thereof are known from various fields of application. For example, EP 0 765 101 A1 discloses a method for producing a flat friction ring which consists of a supporting ring and a friction lining which is provided on at least one supporting ring side and forms at least approximately radial oil grooves and which initially is cut out from a friction lining web having slots for the subsequent oil grooves and is then glued onto the supporting ring. The friction lining is cut from the friction lining web in the form of a strip and, in the region of the connecting webs between the friction lining sectors separated by the slots, is bent polygonally into a ring and adhered to the supporting ring.

DE 10 2006 028 512 A1 discloses a method and an apparatus for producing a ring body from sheet metal. The ring body is provided with stamped areas and/or folded areas. These are first formed on a sheet-metal strip which is rolled and the free ends of which are welded together to form the ring body.

With spring packages having supporting rings there is the problem that due to the required strength/rigidity, there is much waste produced of the solid material during production, so that the material costs are very high.

It is the object of the invention is to provide a spring package comprising at least one supporting ring which can be produced with less material waste.

This object is met by the subject matter of the independent patent claims. Advantageous developments are indicated in the dependent claims.

According to the invention, the supporting ring is formed from a sheet-metal strip which is stamped and then bent or brought into a ring shape and the ends of which are permanently connected to each other.

This permits material savings of up to 70% as compared to an existing supporting ring. Furthermore, it is thus also possible to give the tool structure for producing a supporting ring according to the invention a modular design. To permanently connect the ends, these are, for example, welded together, glued, clinched or otherwise permanently connected to each other.

Moreover, the invention is also achieved by a method for producing a supporting ring for a spring package according to the invention, comprising the steps of: stamping an elongated sheet-metal strip of predetermined length and predetermined width, wherein elongated is understood as a shape which is substantially rectangular, with the extension in the longitudinal direction being greater than the extension in the width direction. A further step is the provision of spring holders, for example, by introducing and/or widening circular openings or holes along the longitudinal direction, preferably at regular intervals, whereby a continuous circumferential edge projecting in the height direction is generated. Optionally, the sheet-metal strip may already be perforated, i.e. provided with circular openings, along the longitudinal direction, preferably at regular intervals. Another step is the introduction of imprints or impressions on a longitudinal side of the sheet-metal strip while forming a ring shape, wherein the impressions are arranged on the ring inner side or on the ring outer side, wherein further preferably nose- or shoulder-like connecting webs are formed. Subsequently, the two axial ends, which correspond to the lateral edges in the width direction of the sheet-metal strip, are connected to each other.

Advantageous embodiments which are claimed in the dependent claims will be explained below.

For the spring package, it has turned out to be advantageous if at least one of the supporting rings, across the circumference thereof, has substantially equally distributed spring holders for positioning one each of the coil springs. The spring holders on the one hand serve for aligning or arranging the coil spring and on the other hand for retaining the coil spring in this position, so that the spring does not slip during operation, even under bending, tension, etc. of the spring package and under the influence of centrifugal forces, so that the function of the spring package is guaranteed.

For the spring holders, it has turned out to be advantageous if the spring holders are formed as substantially circular openings with a circumferential edge projecting in axial direction of the spring package in the direction towards the coil springs, as cup-shaped protrusions or as tabs projecting in the direction towards the coil springs.

Advantageous embodiments in this regard provide that the edge or the cup-shaped protrusion, in the assembled state of the spring package, is arranged radially within an axial coil spring end. In this case, the edge in the assembled state is surrounded by one axial coil spring end and can prevent that the coil spring subjected to load of the spring package, e.g. during operation, slips or even pops out. Therefore, this edge can also be referred to as spring pin. Alternatively, it is also conceivable that the edge or the cup-shaped protrusion, in the assembled state of the spring package, is arranged radially outside of the axial coil spring end. This means that the edge surrounds the axial end of the coil spring. In particular, the cup-shaped protrusion extends either in the (axial) direction away from the coil springs or in the (axial) direction toward the coil springs, depending on whether it surrounds the coil spring or is surrounded by the coil spring.

An advantageous embodiment provides that at least one of the supporting rings comprises recesses or notches distributed (substantially equally) across the circumference thereof. These facilitate the forming or bending of the sheet-metal strip into a ring shape.

A particularly advantageous embodiment provides that the recesses are each arranged between two circular openings. This means that the recesses and openings are arranged alternately across the circumference. This has the advantage that the impressions introduced by bending, for example in the form of nose- or shoulder-like connecting webs, are formed between the openings or spring pins and thus do not affect the positioning of the coil springs during installation and the mobility of thereof during operation.

In this regard, it is advantageous if the supporting ring, on its inner peripheral edge or on its outer peripheral edge, has a circumferential edge projecting in the axial direction of the spring package. Such an edge stiffens the inner peripheral edge or the outer peripheral edge and thereby also increases the rigidity of the entire supporting ring, which is very important in particular for assembly.

Furthermore, it has turned out to be advantageous if at least one of the supporting rings on the inner peripheral side of the recess has a nose- or shoulder-like connecting web projecting in the axial direction from the plane of the supporting ring in the direction towards the opposite or parallel spaced apart supporting ring. Thus, the connecting webs project in the axial direction towards the coil springs and thus require no additional space. Due to the fact that the connecting webs are created by the bending operation in which the supporting ring is formed from the sheet-metal strip, the connecting webs can also be referred to as bending ribs.

For the recesses, there are different embodiments conceivable. The recesses, in particular before bending, may have, for example, a closed or an open or slotted contour.

Furthermore, there are different shapes conceivable for the recesses. Possible embodiments for the closed contour provide that, in particular before bending, it is formed so as to have a rectangular, trapezoidal, anvil-like or similar shape. A possible embodiment for the open contour provides that it is slotted up to the longitudinal side of the sheet-metal strip which forms the inner peripheral edge or the outer peripheral edge of the supporting ring, and extends approximately up to the longitudinal central axis of the sheet-metal strip.

Advantageous embodiments for the coil springs provide that the coil springs are designed either as tension or compression springs. This can be varied depending on the intended field of application for the spring package. In this regard, various designs of the coil springs are conceivable as well, such as e.g. a cylindrical, a barrel-shaped or a conical design.

For the method for producing a spring supporting ring for a spring package according to the invention, it has been found to be advantageous if the spring holders are formed as openings, as cup-shaped protrusions or as tabs.

Furthermore, it is advantageous for the method to introduce recesses between two spring holders prior to the introduction of impressions on the longitudinal edge, with the recesses before bending of the sheet-metal strip into a ring furthermore having a closed or an open, e.g. slotted, contour.

Furthermore, in order to create an advantageous embodiment of the spring package in the production method of the supporting ring, it may be provided that a longitudinal side of the sheet-metal strip, i.e. a lateral edge extending in the longitudinal direction, is edge-folded prior to bending such that it projects in the same direction as the circumferential edge of the circular openings. By way of this, the ring can be additionally reinforced.

In other words, the invention comprises a spring package with at least one supporting ring and a method for producing a supporting ring for a spring package according to the invention. In this connection, the known spring pins are introduced into a sheet-metal strip. Between the pins specially shaped notches are stamped. On the subsequent ring inner side, special impressions are introduced such that the strip, by way of the "shortening" of the inner edge, bends to form a ring. The two ends are now connected by a suitable method. Thus, material savings of about 70% per supporting ring can be achieved. Furthermore, a modular tool design can be implemented, resulting in a greater added value, since the entire production can be carried out in one location only.

The invention will be explained in more detail in the following by way of embodiments with reference to the accompanying drawings, in which:

FIG. 5 shows a perspective view of the section of the sheet-metal strip illustrated in

Figure 10:
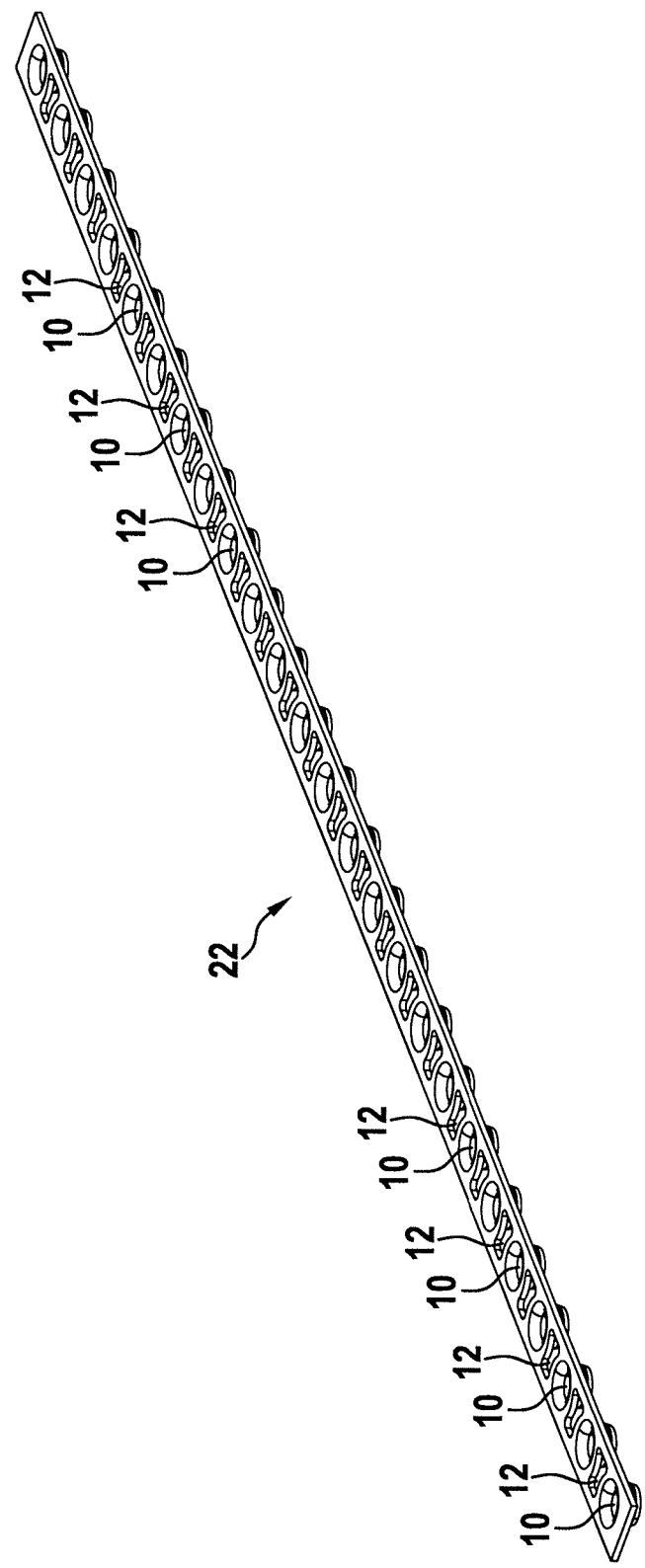
Figure 11:
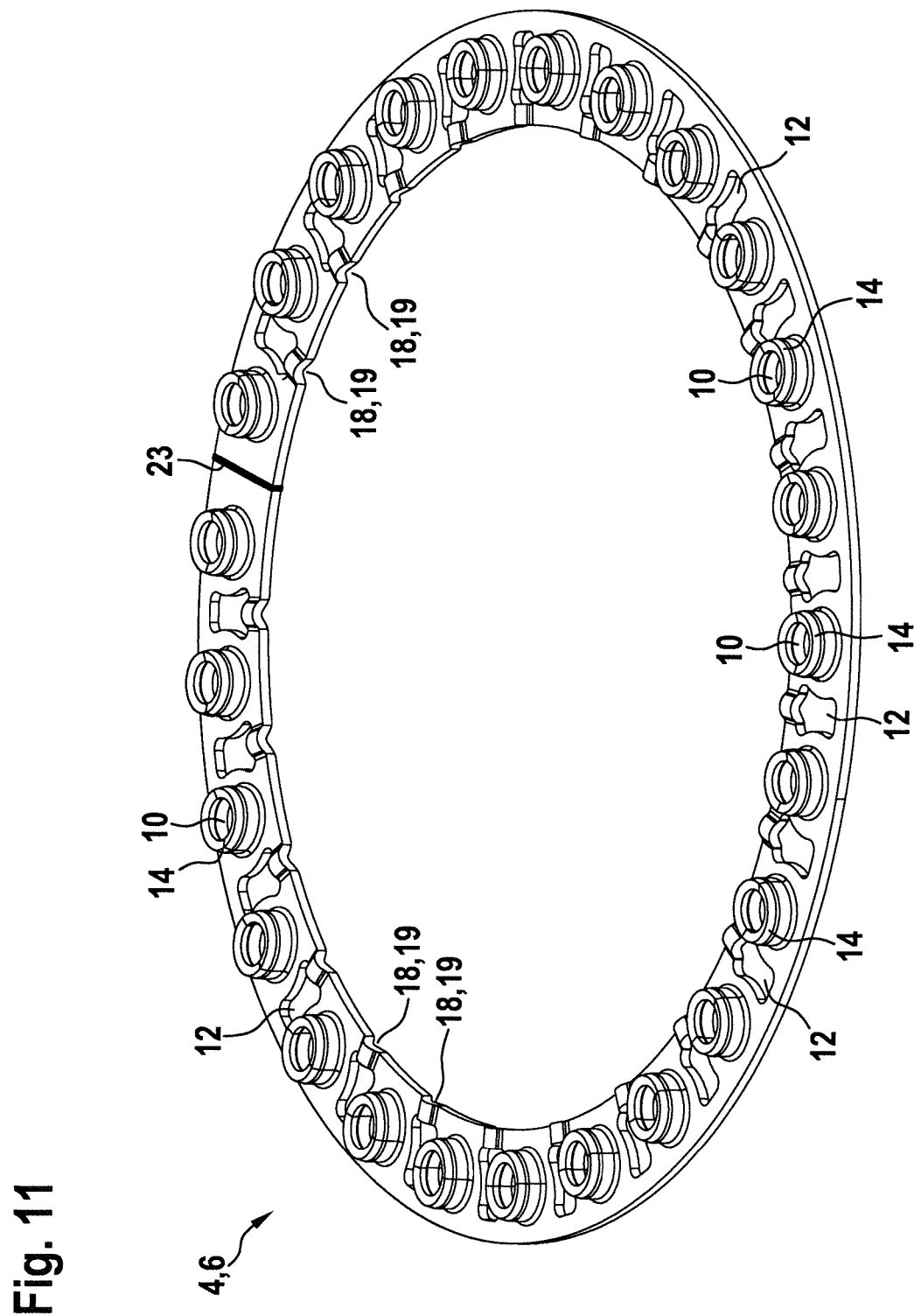
Figure 12:
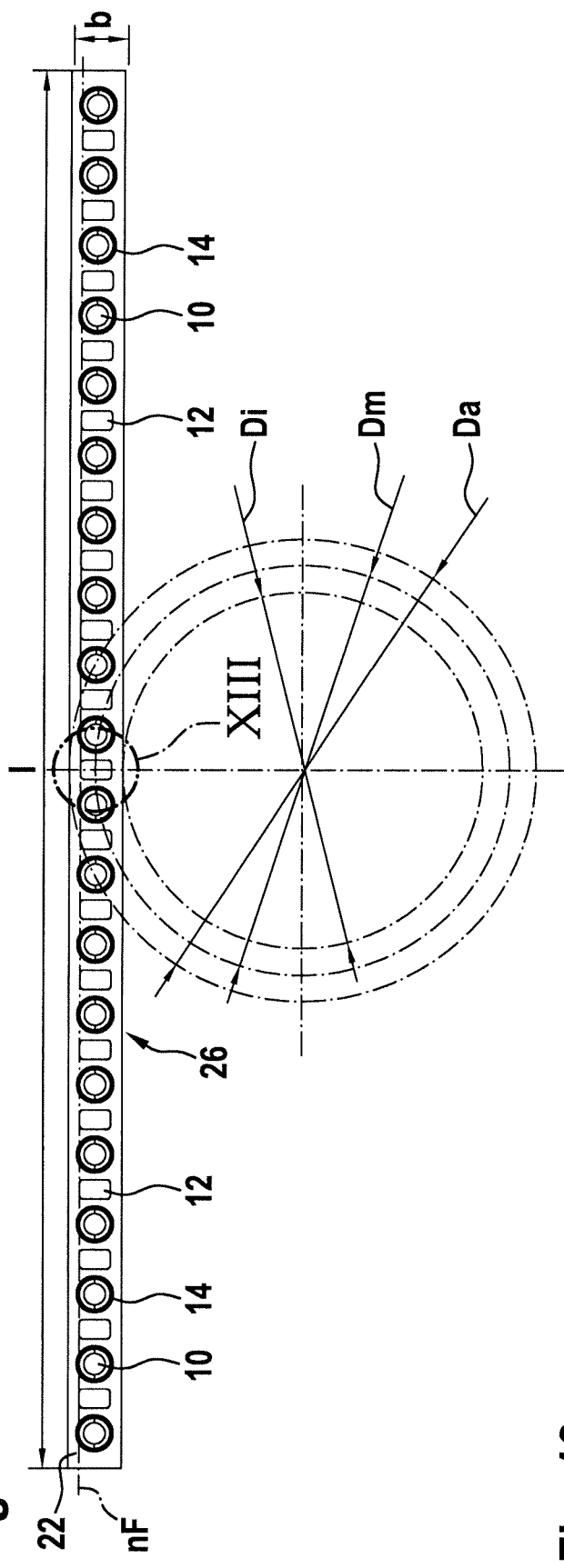
Figure 13:
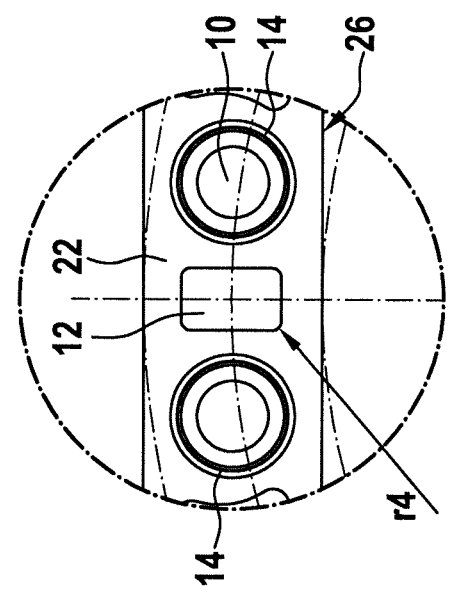
Figure 14:
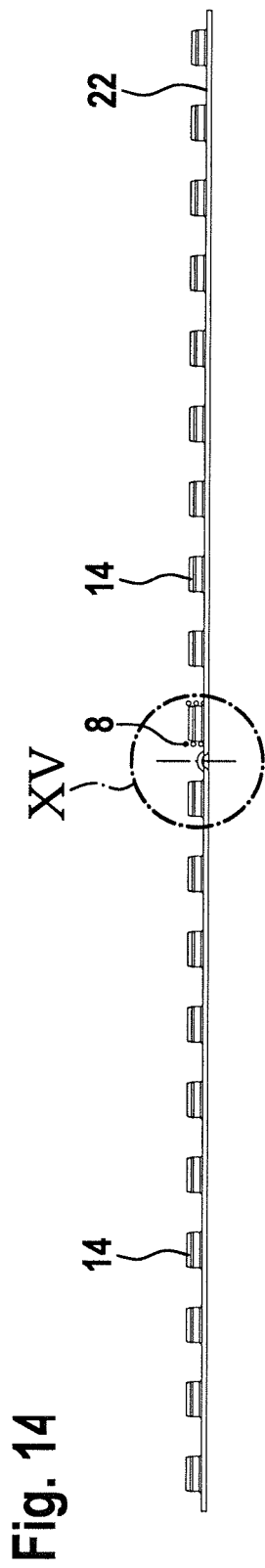
Figure 15:
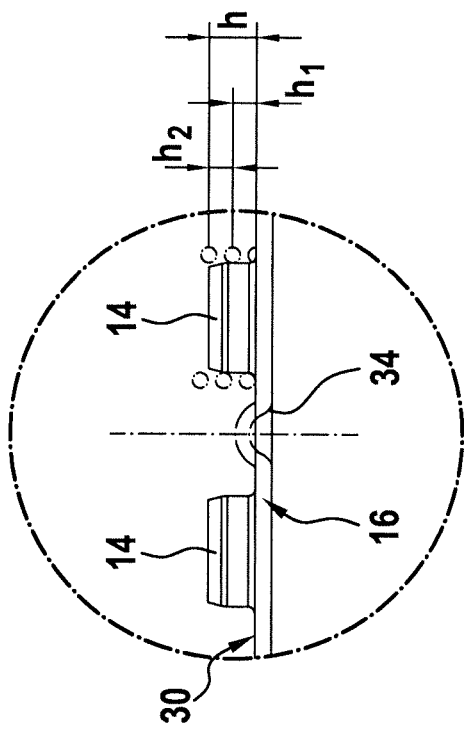
Figure 16:
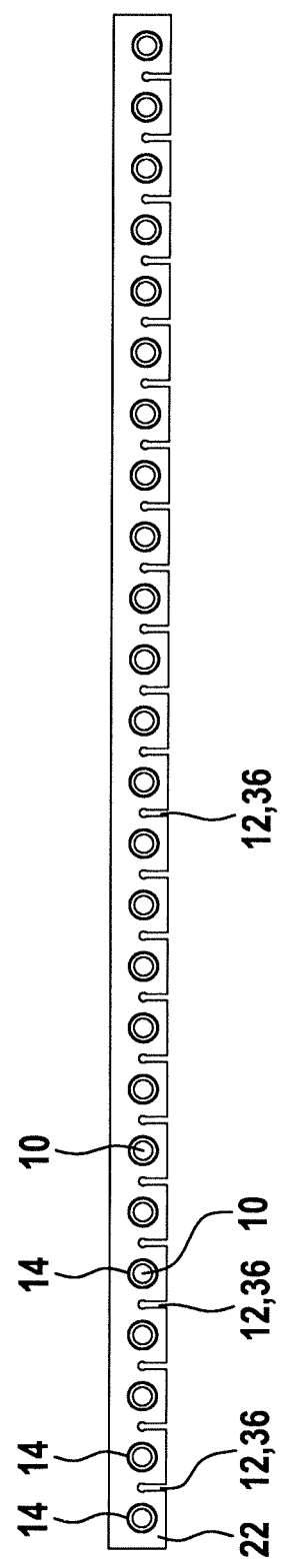
Figure 17:
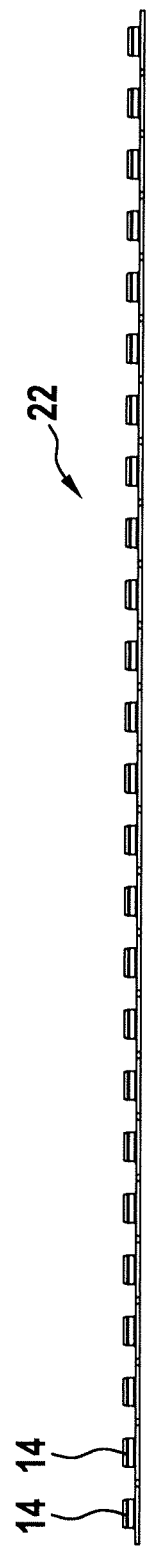
Figure 18:
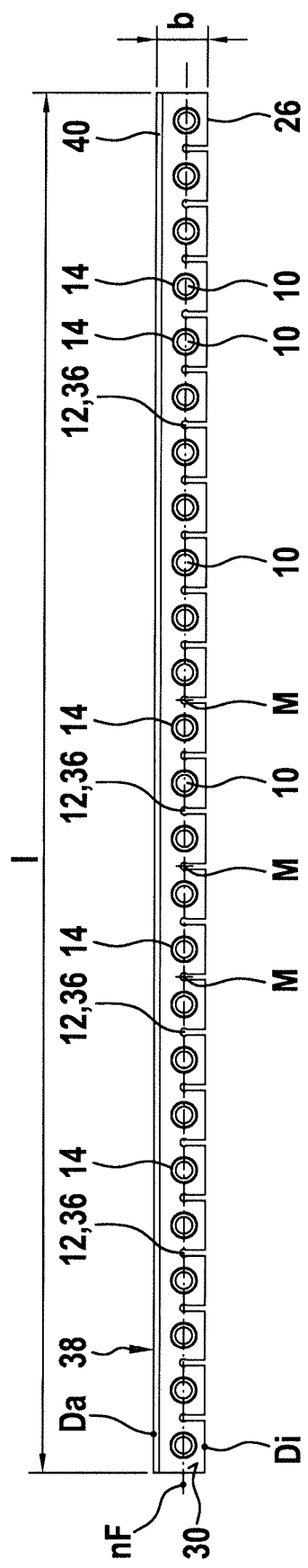
Figure 19:
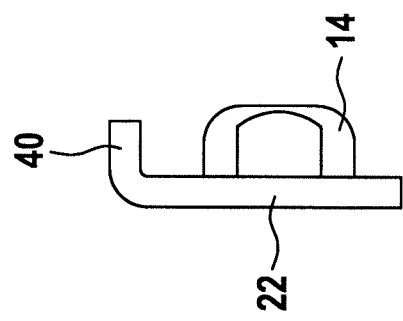
Figure 20:
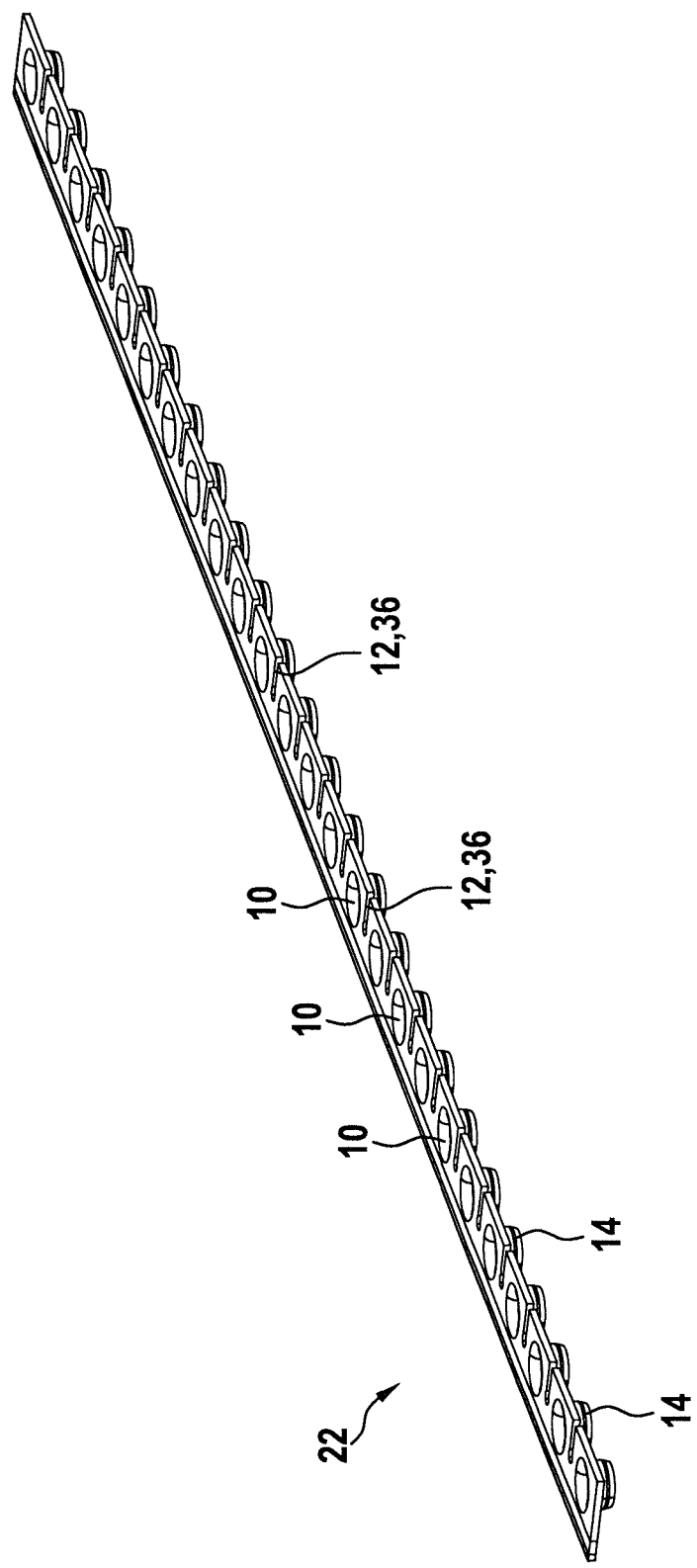
Figure 21:
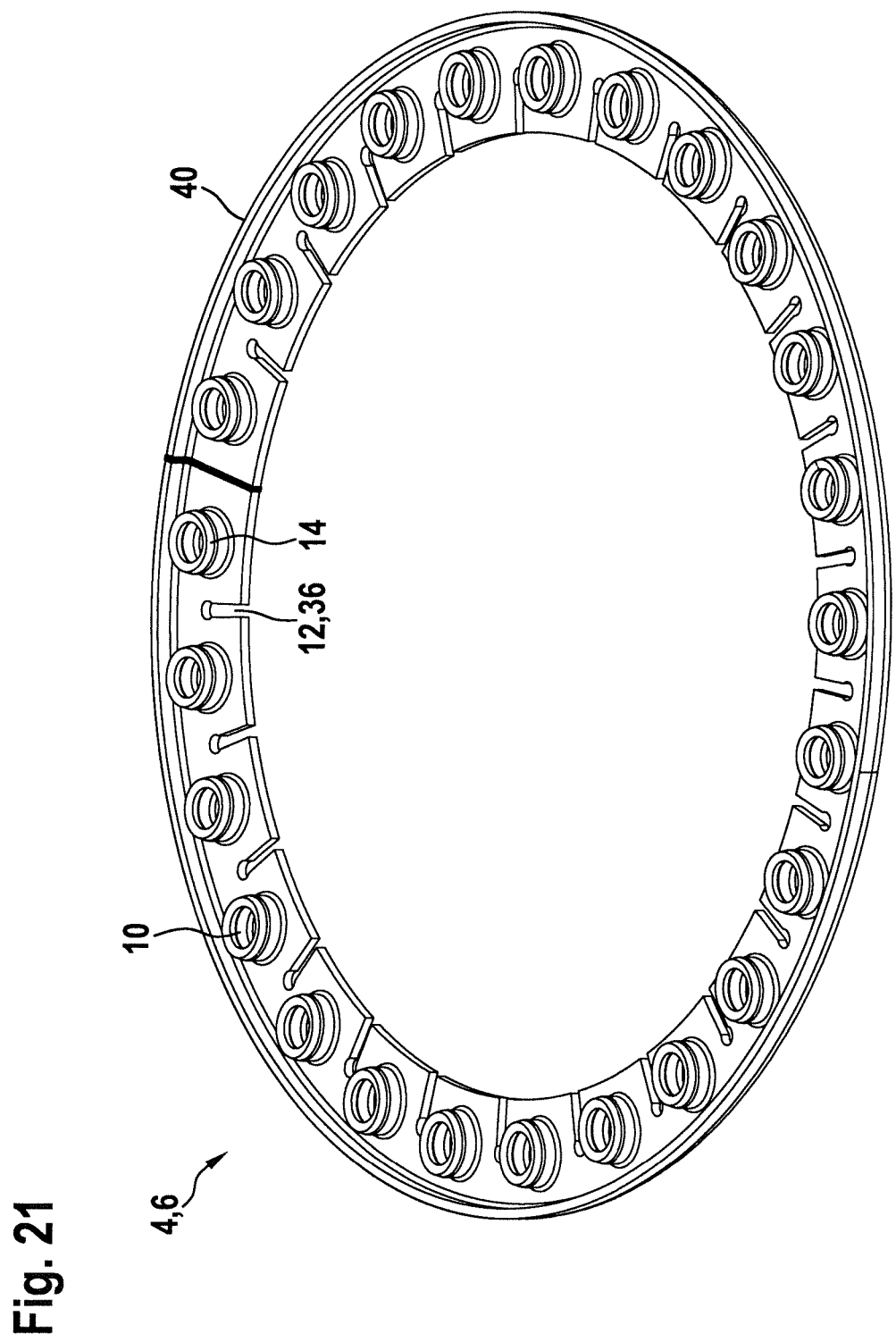
Figure 22:
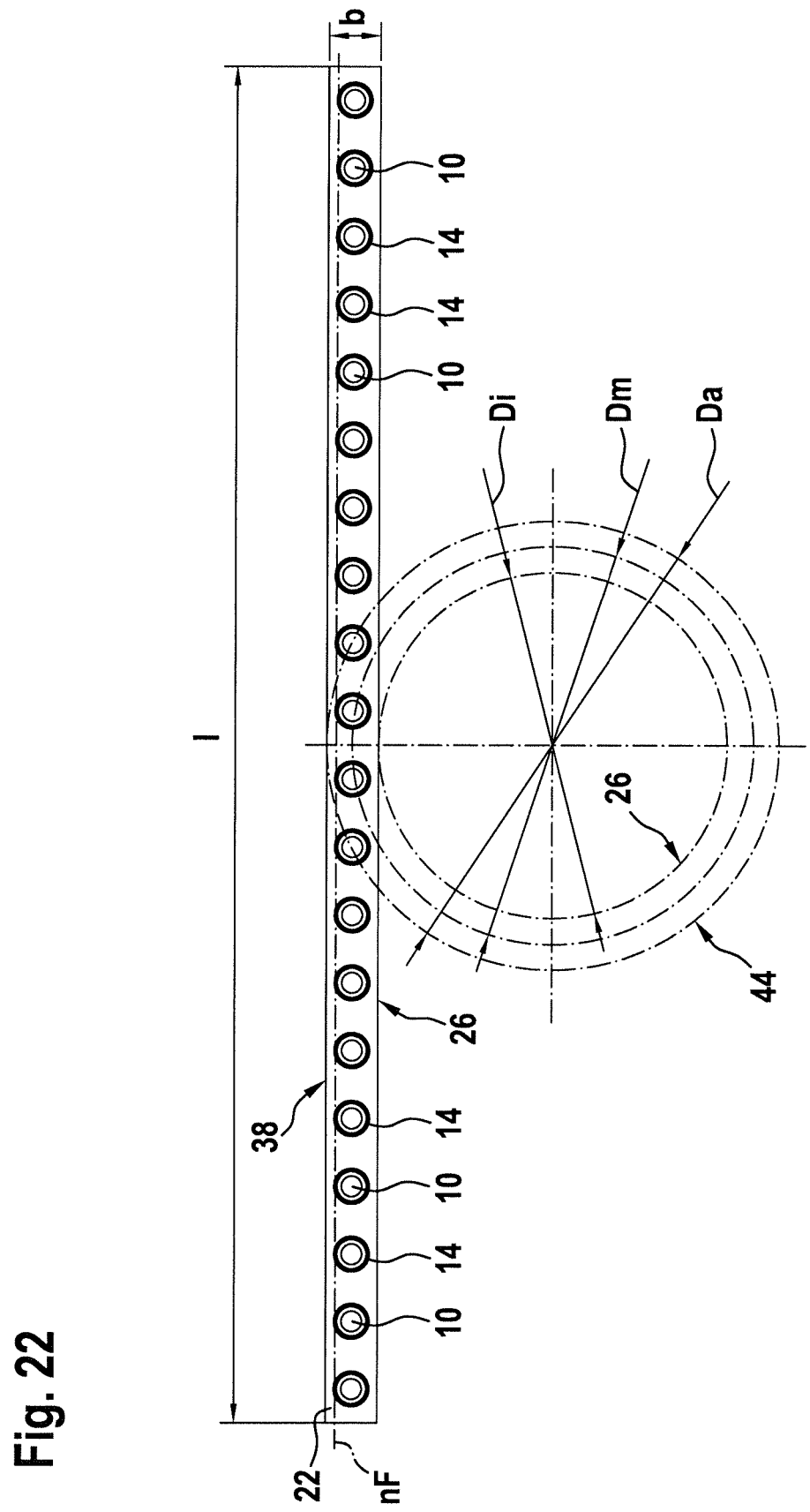
Figure 23:
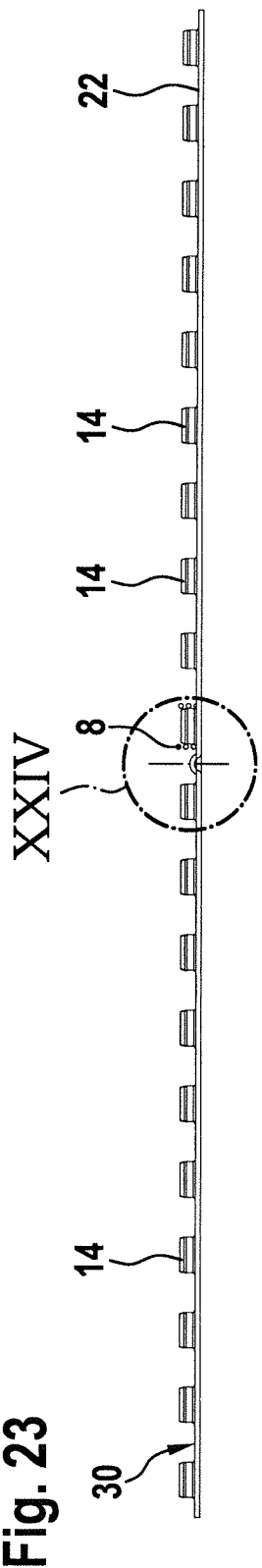
Figure 24:
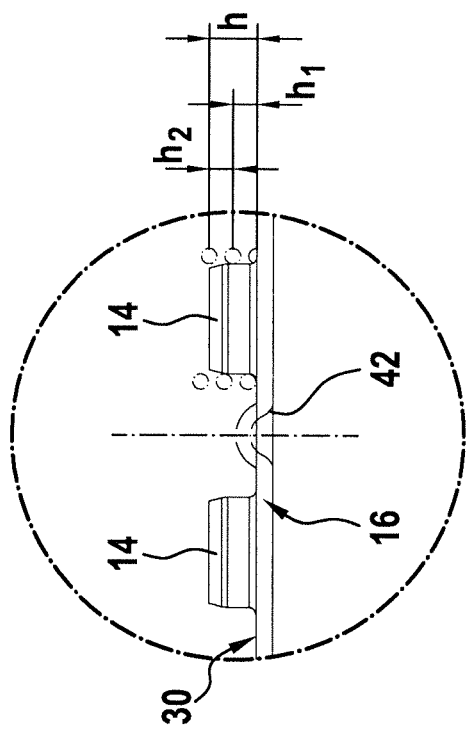
Figure 25:
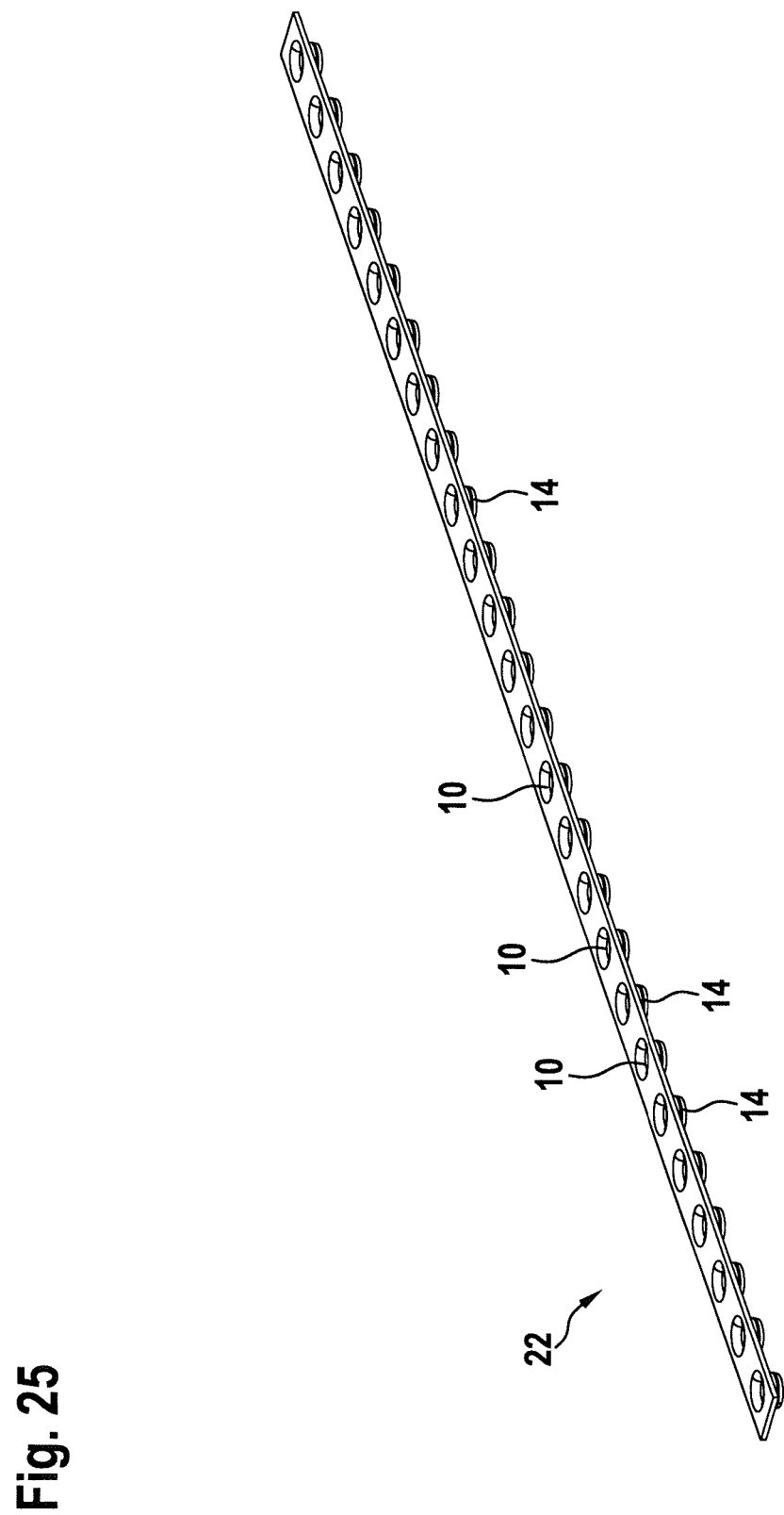
Figure 26:
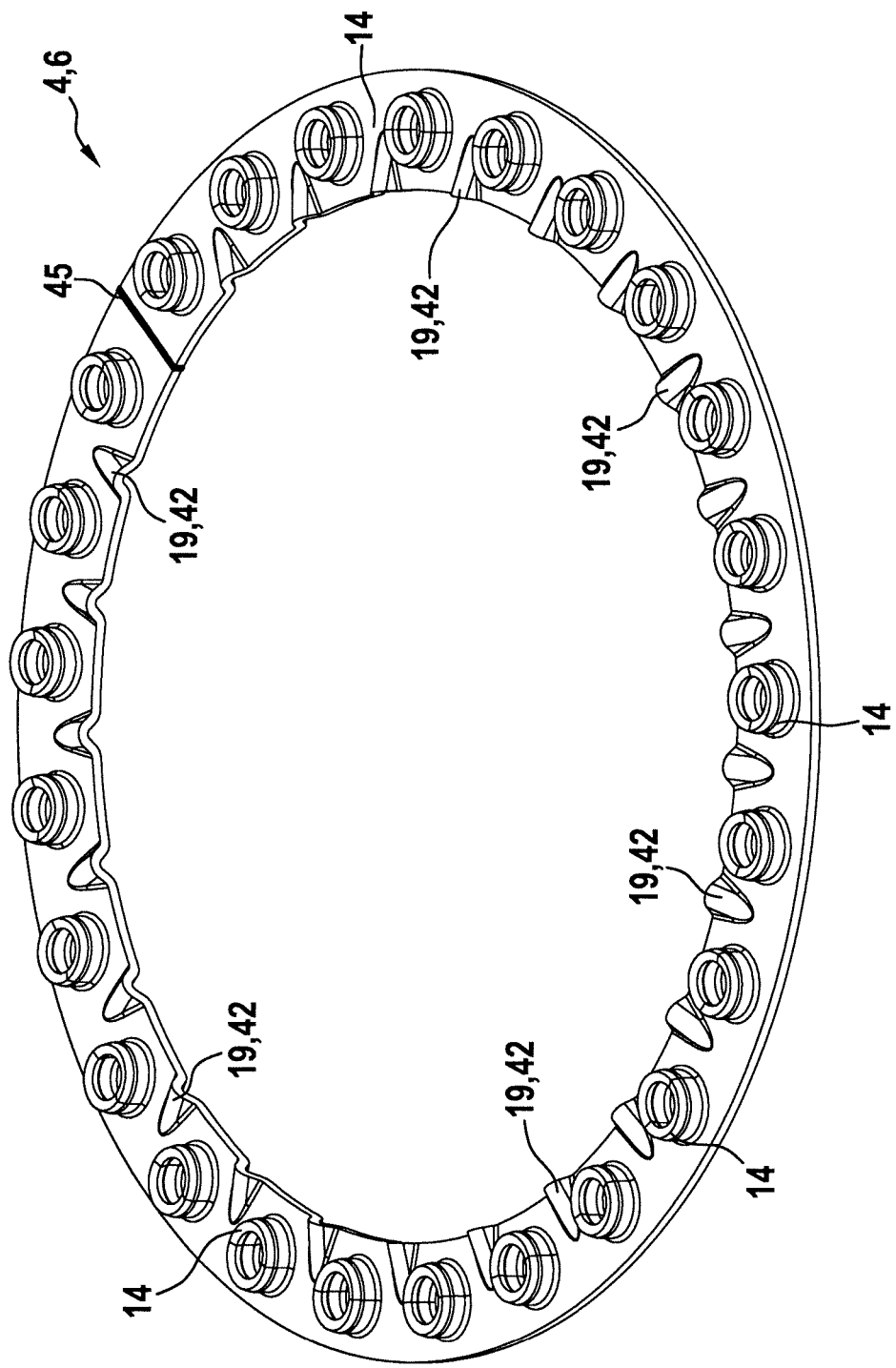
Figure 27:
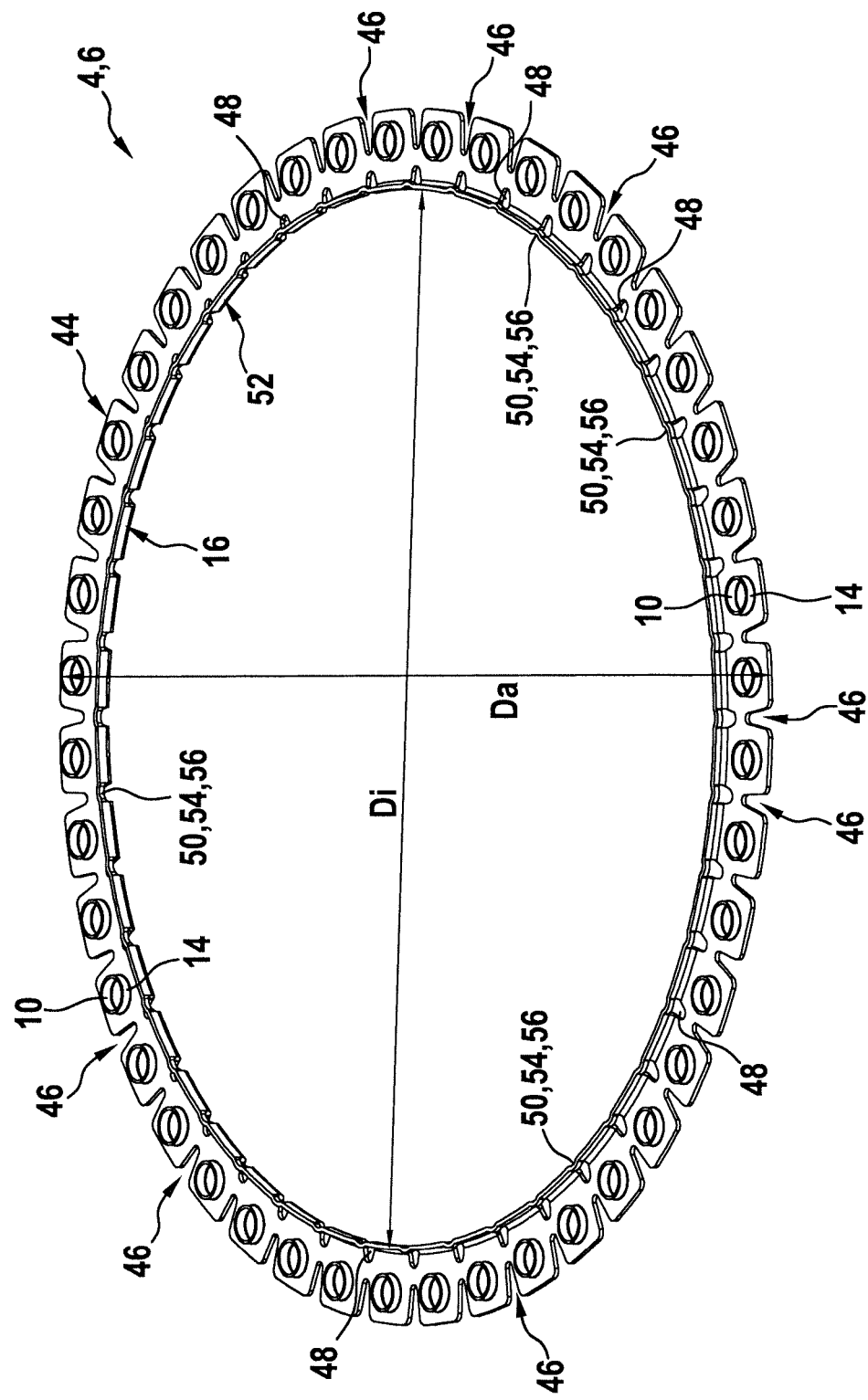
Figure 28:
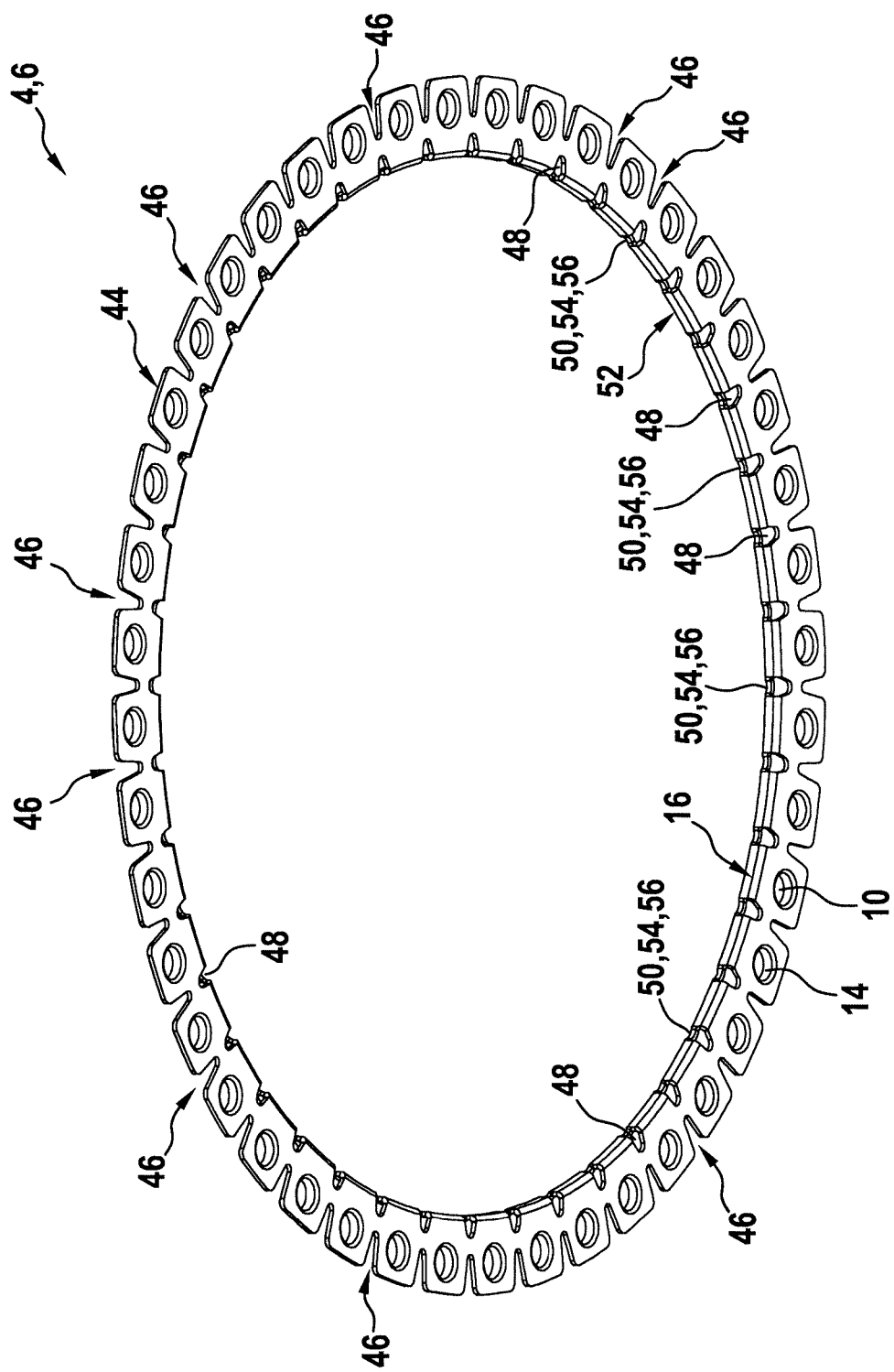
Figure 33:
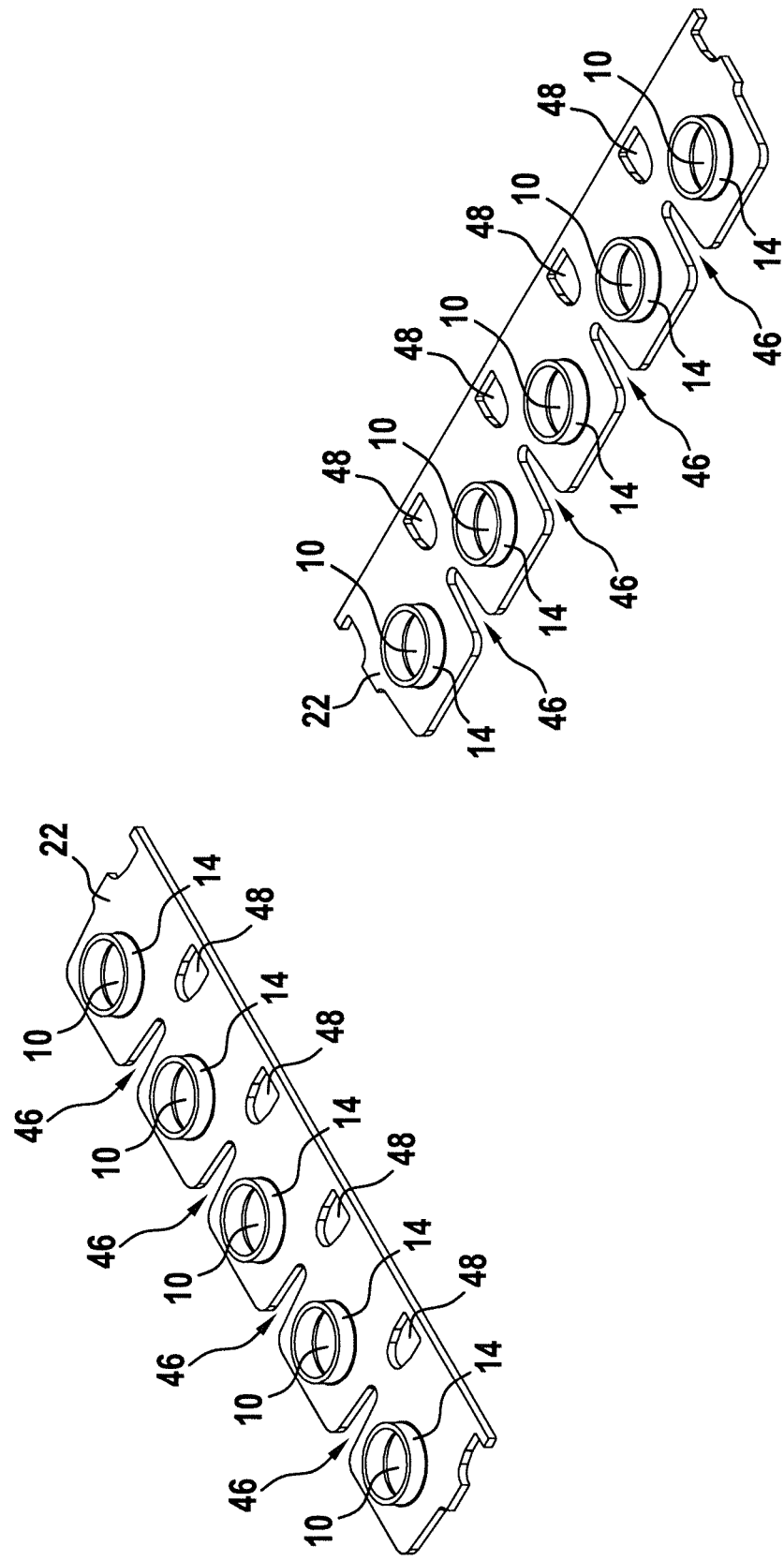
Figure 34:
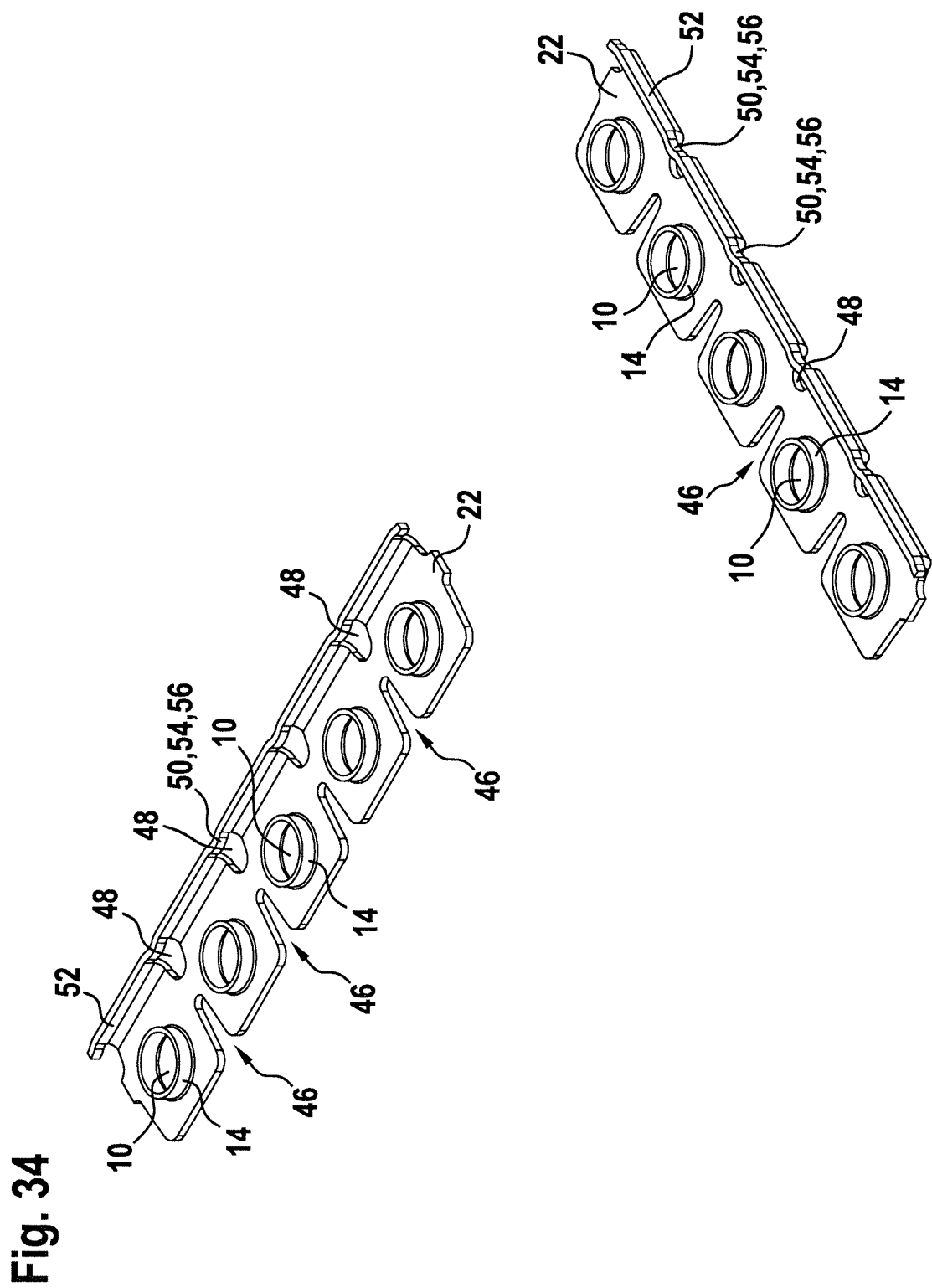
Figure 35:
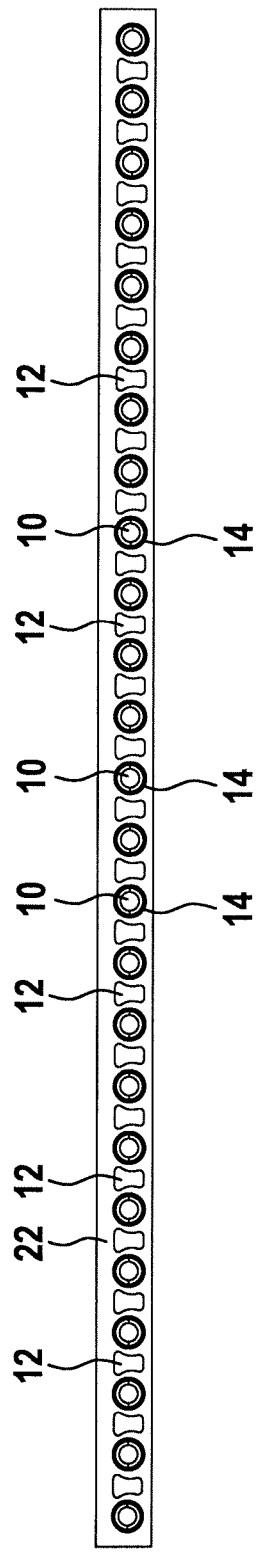
Figure 36:
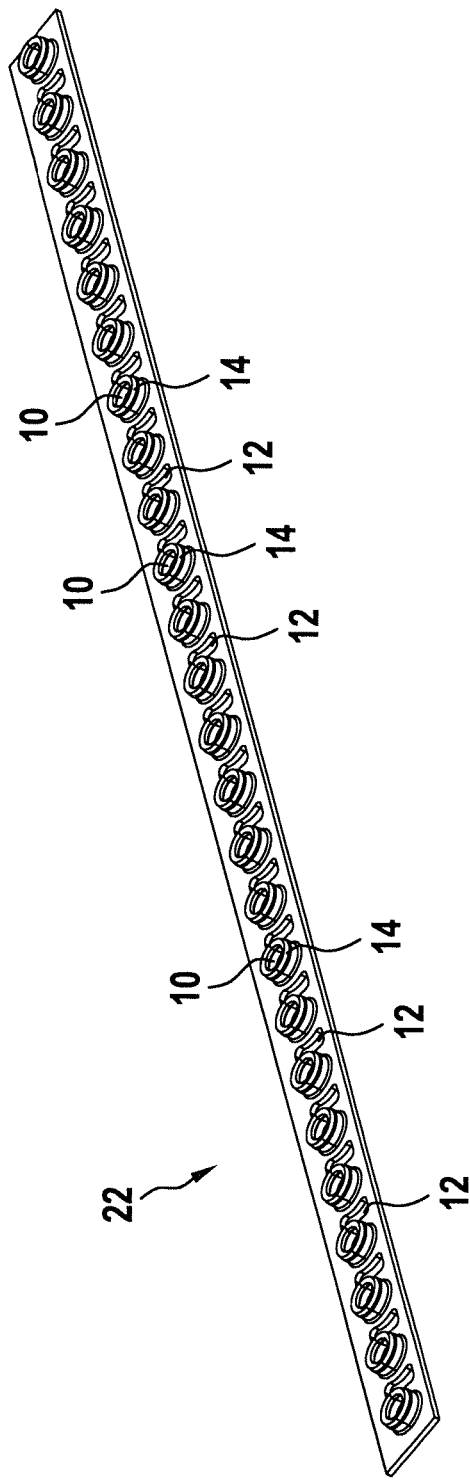
Figure 37:
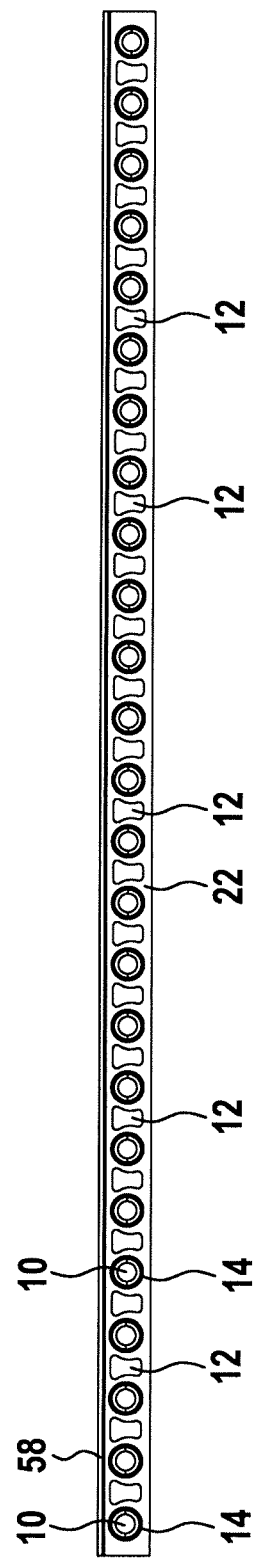
Figure 38:
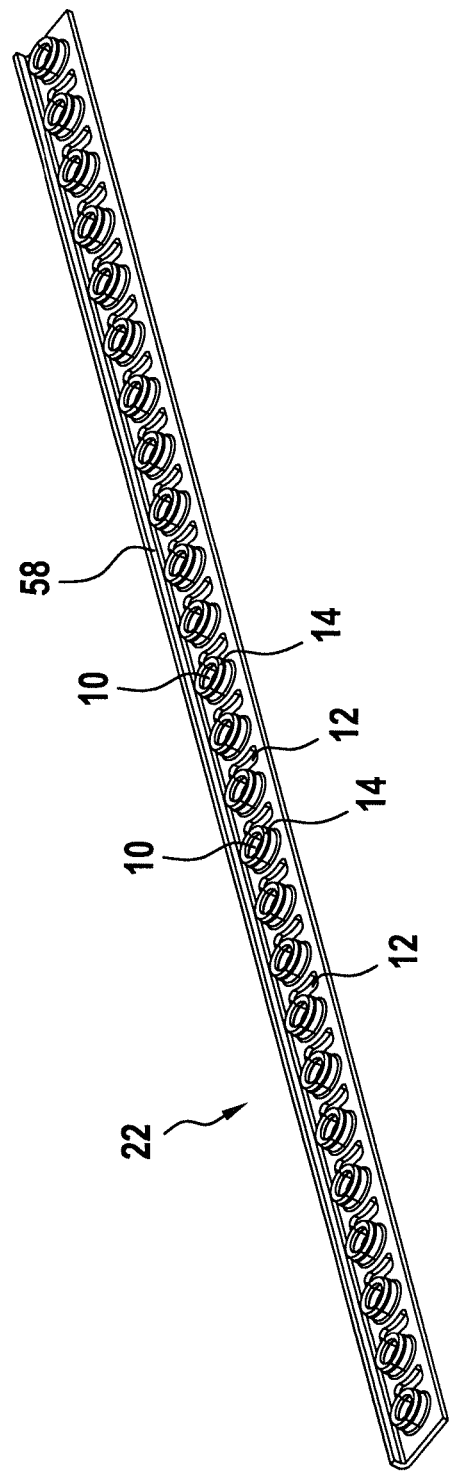
Figure 39:
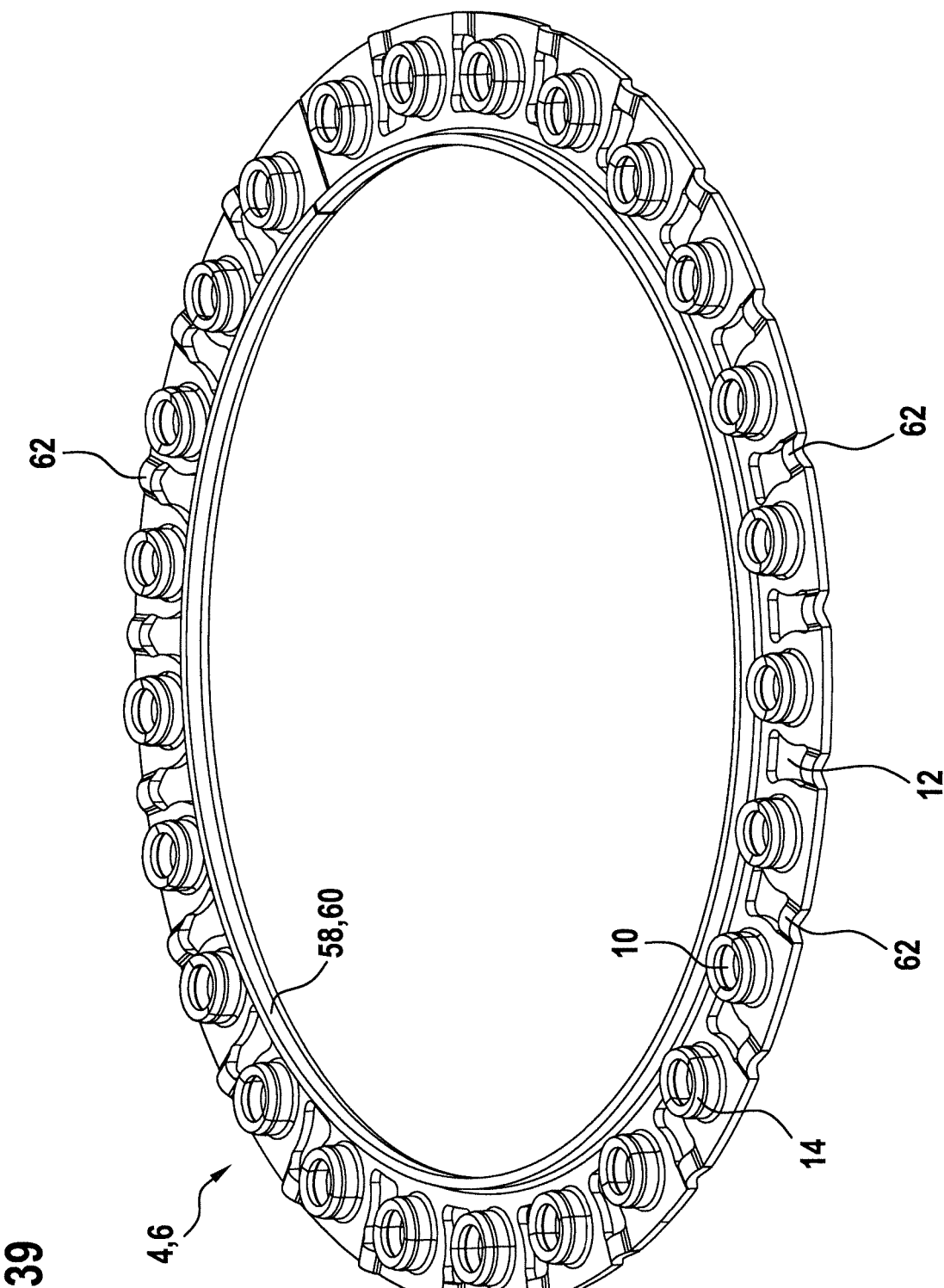
Figure 40:
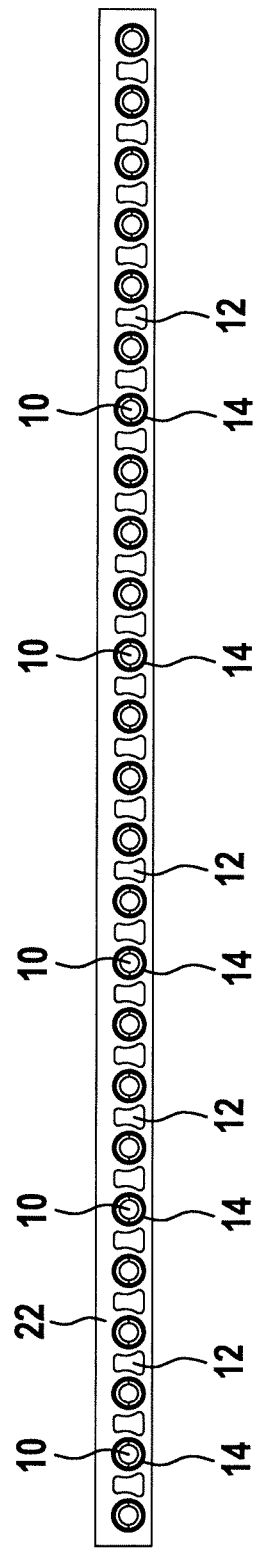
Figure 41:
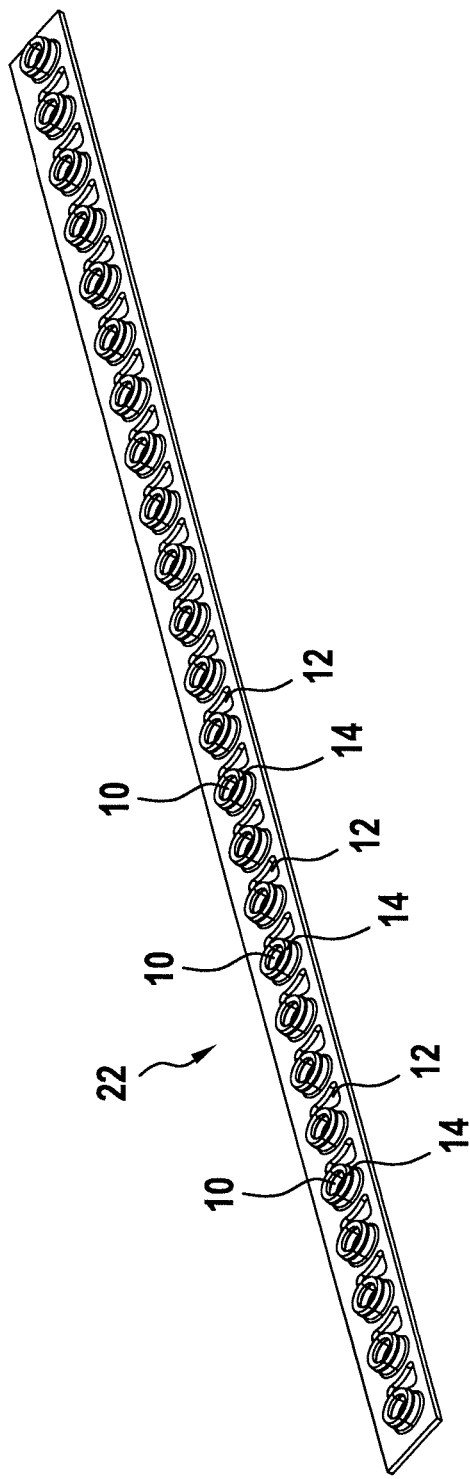
Figure 42:
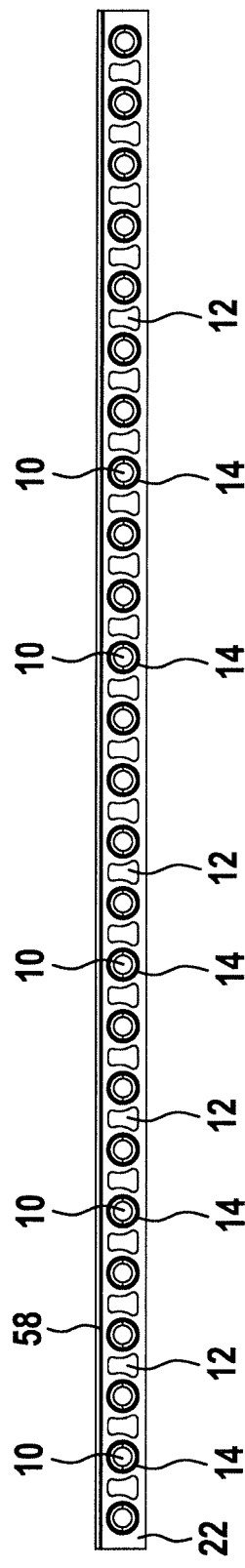
Figure 43:
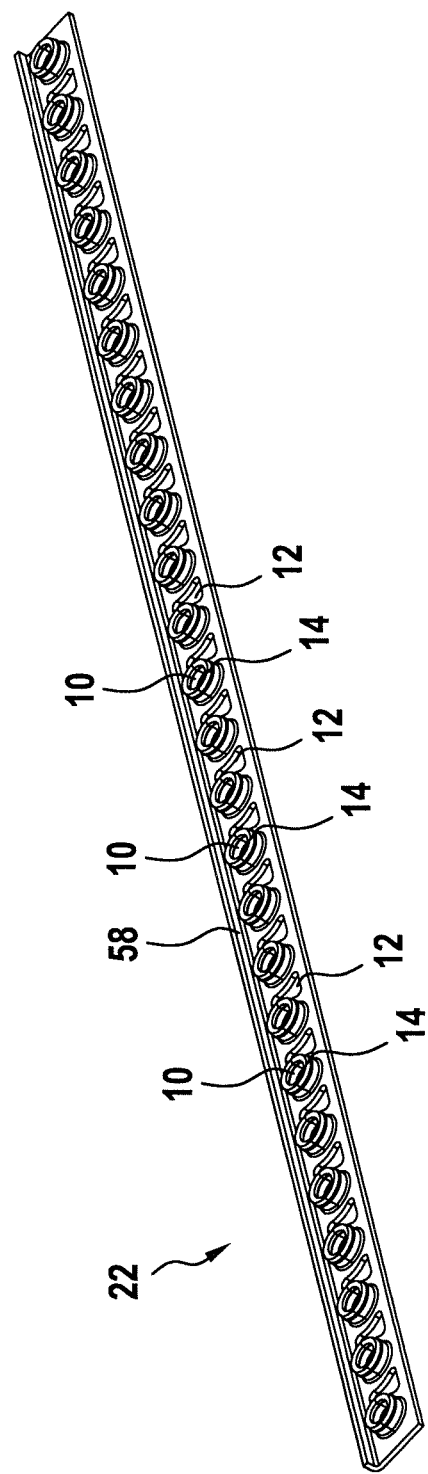
Figure 44:
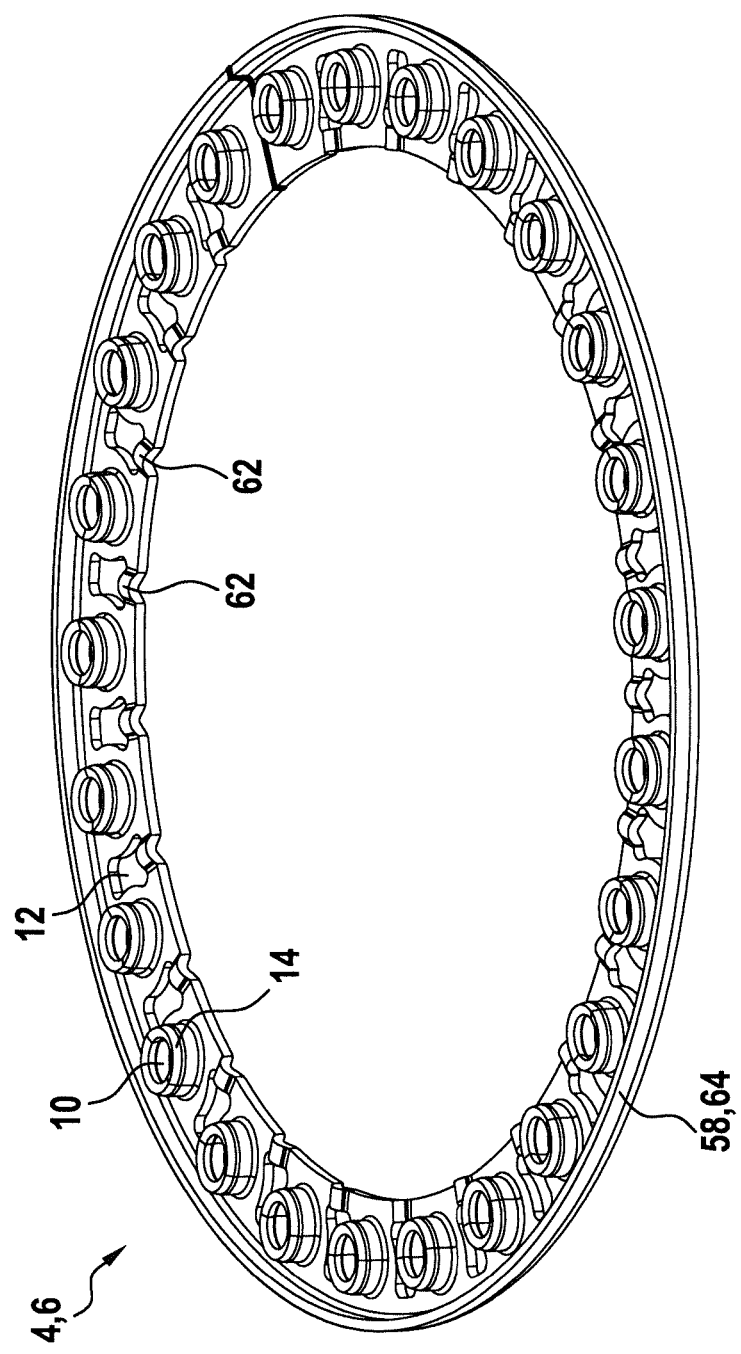
Figure 45:
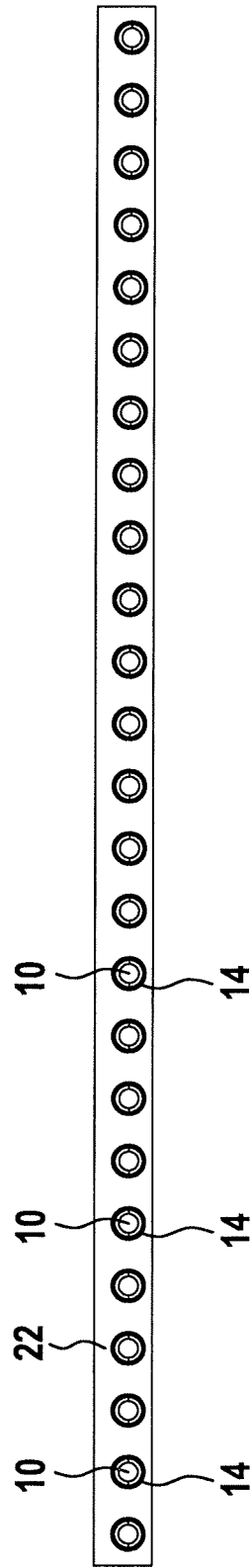
Figure 46:
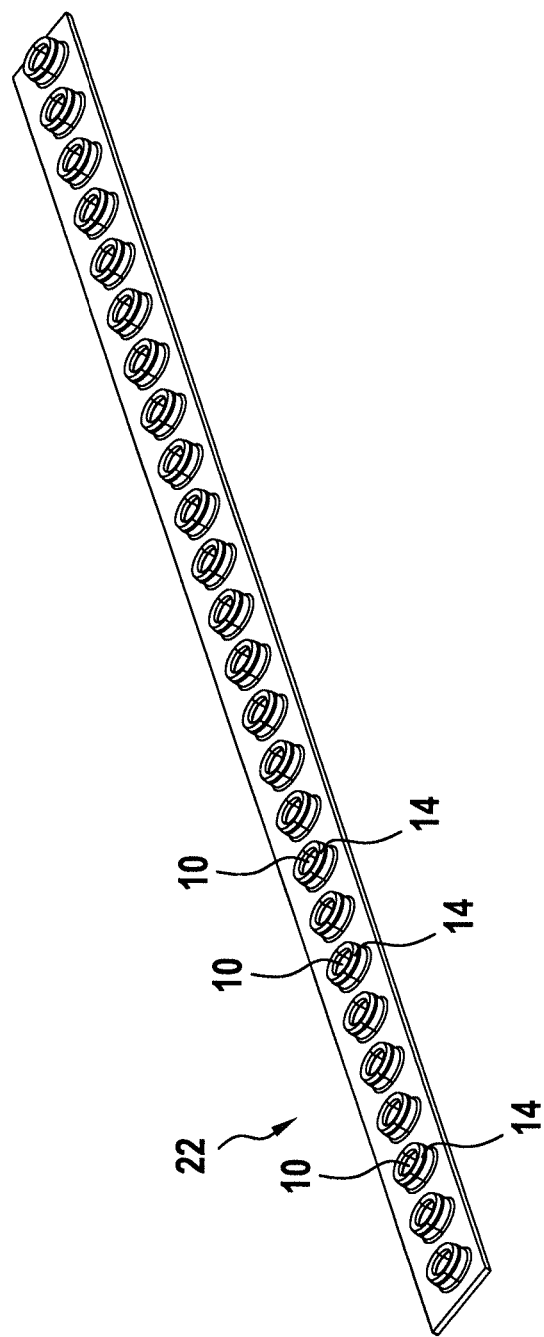
Figure 47:
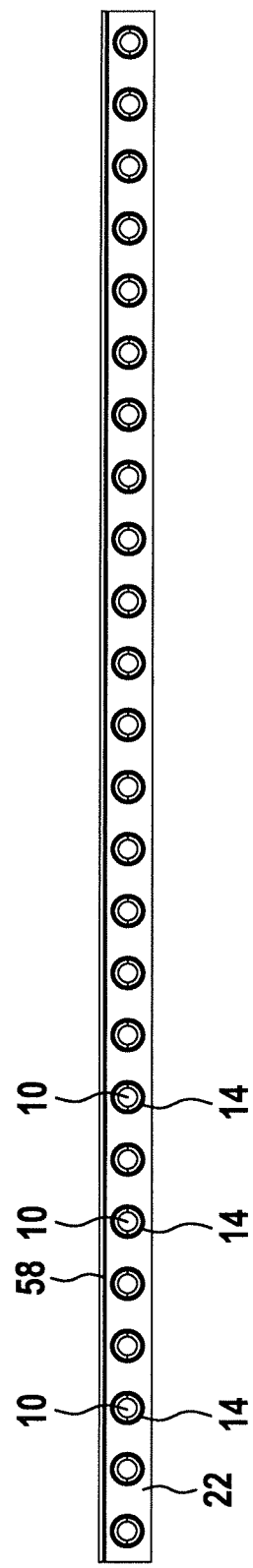
Figure 48:
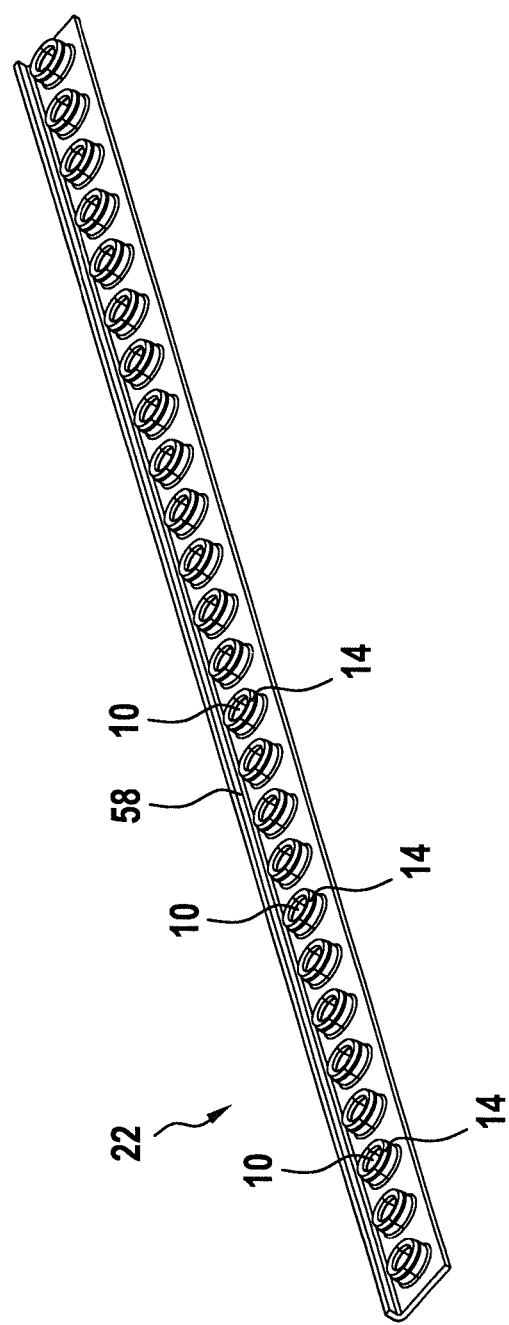
Figure 49:
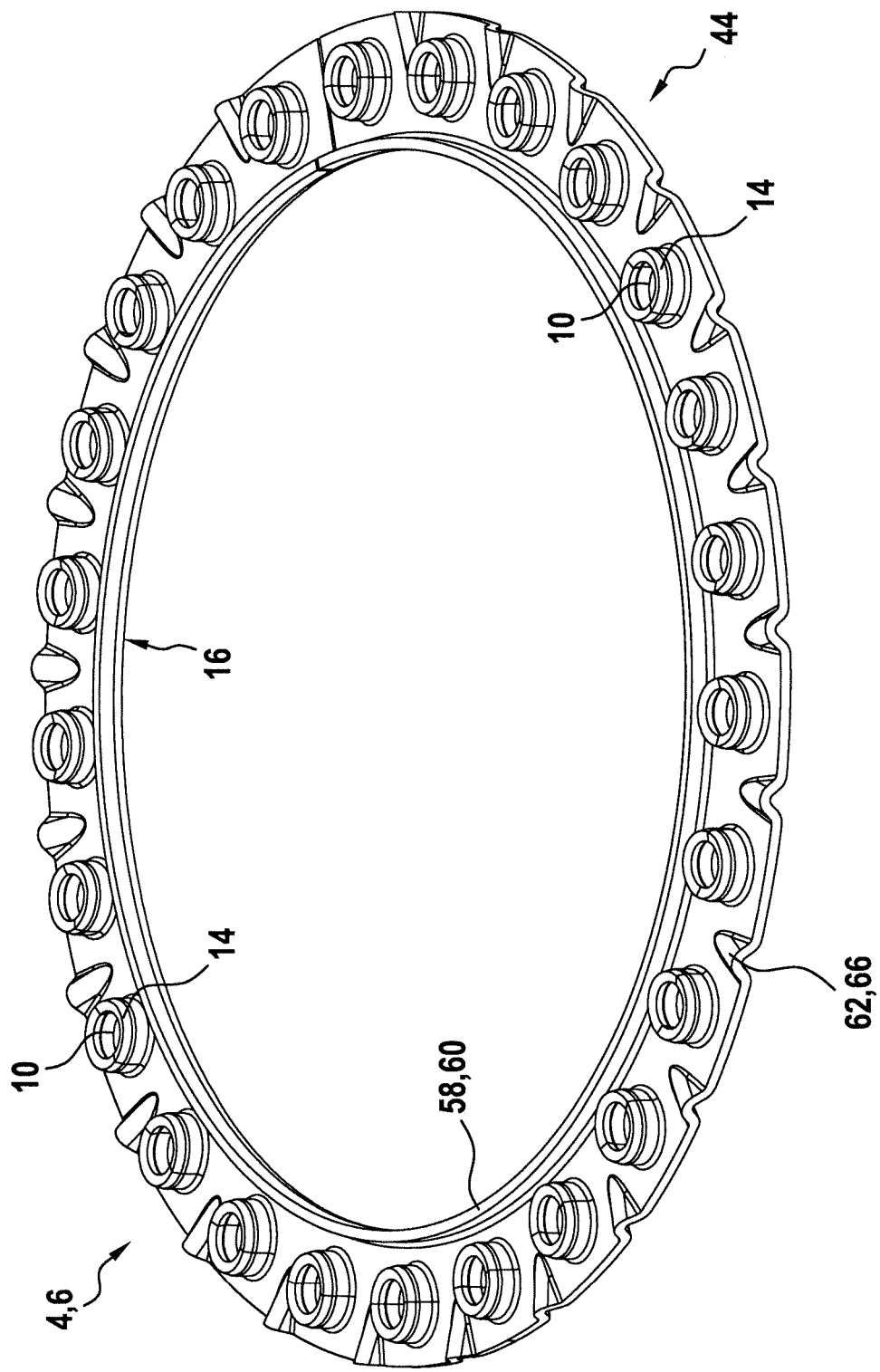
Figure 52:
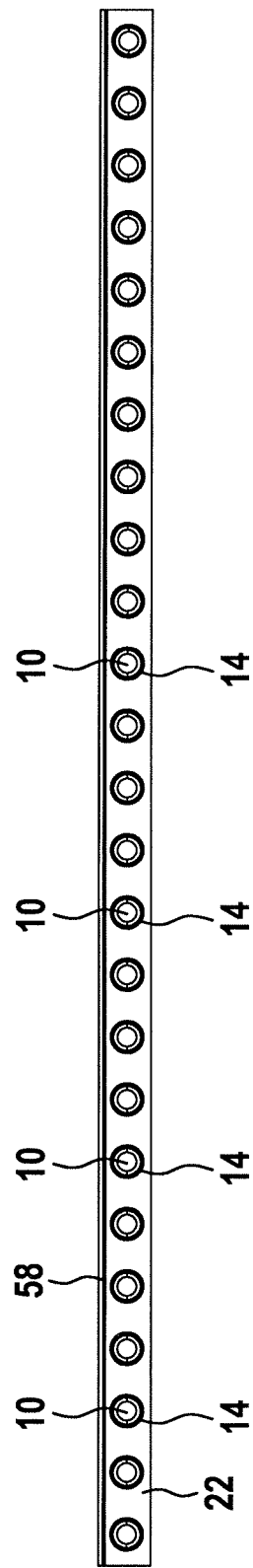
Figure 53:
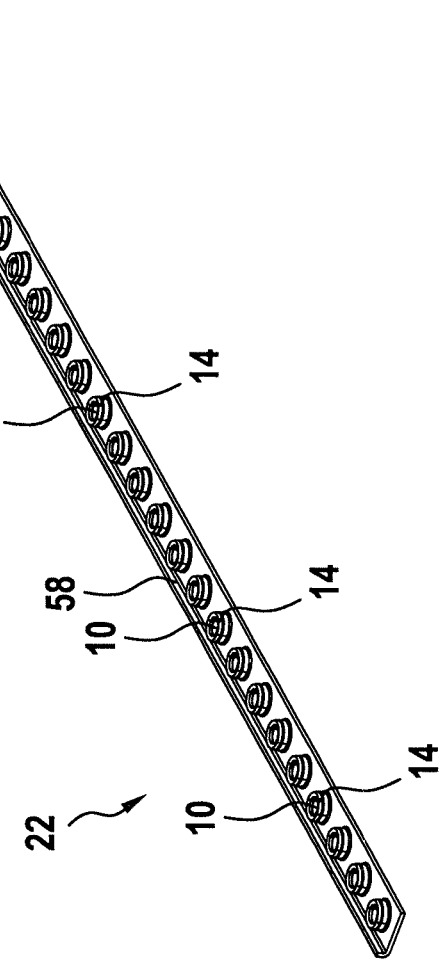
Figure 54:
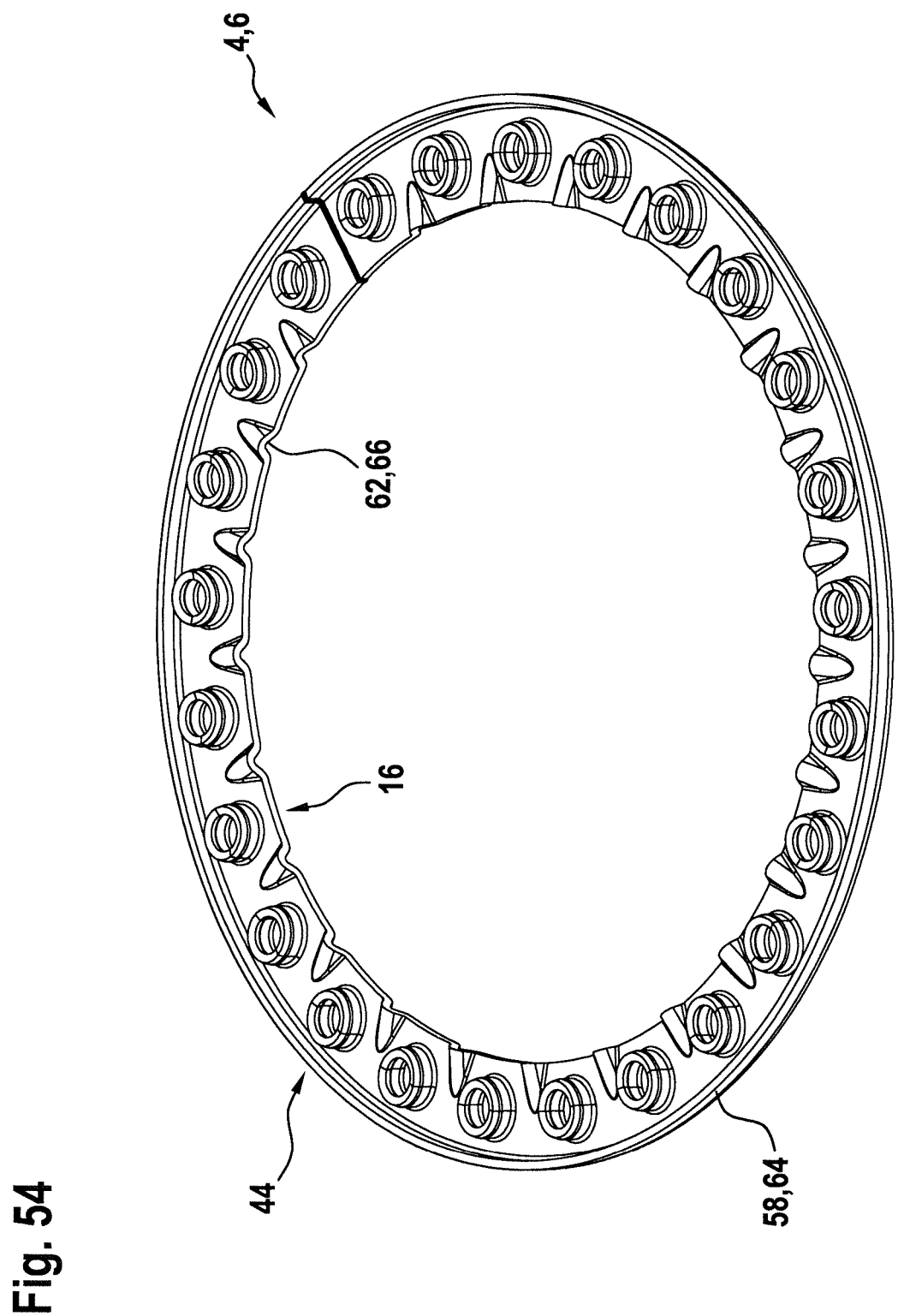
Figure 55:
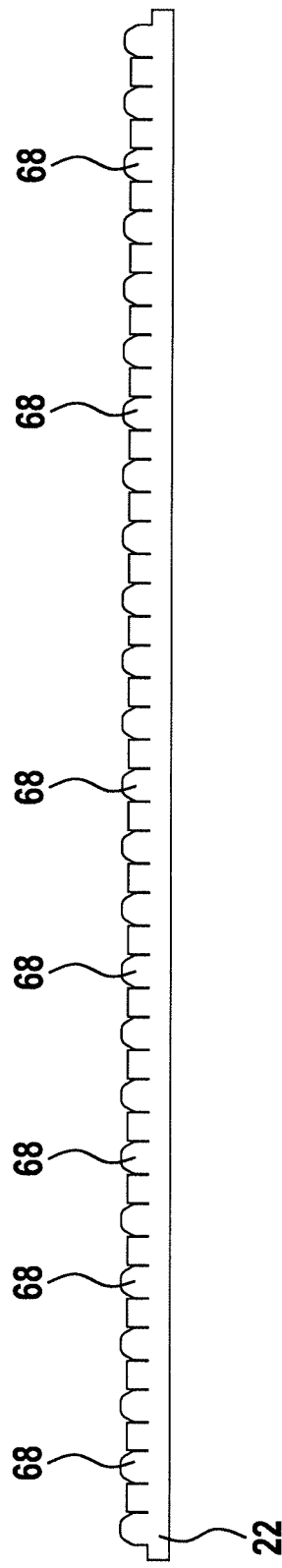
Figure 56:
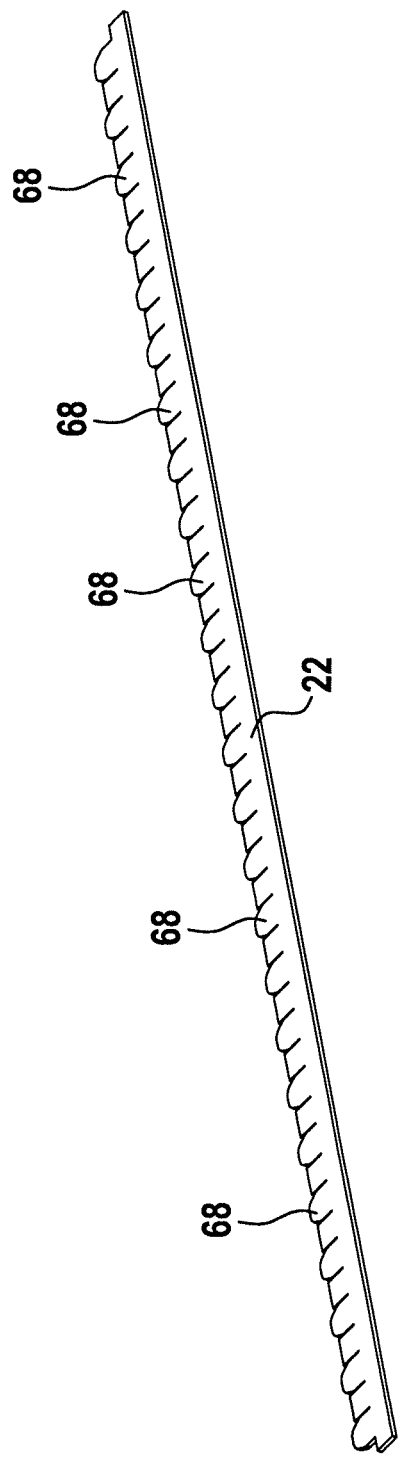
Figure 57:
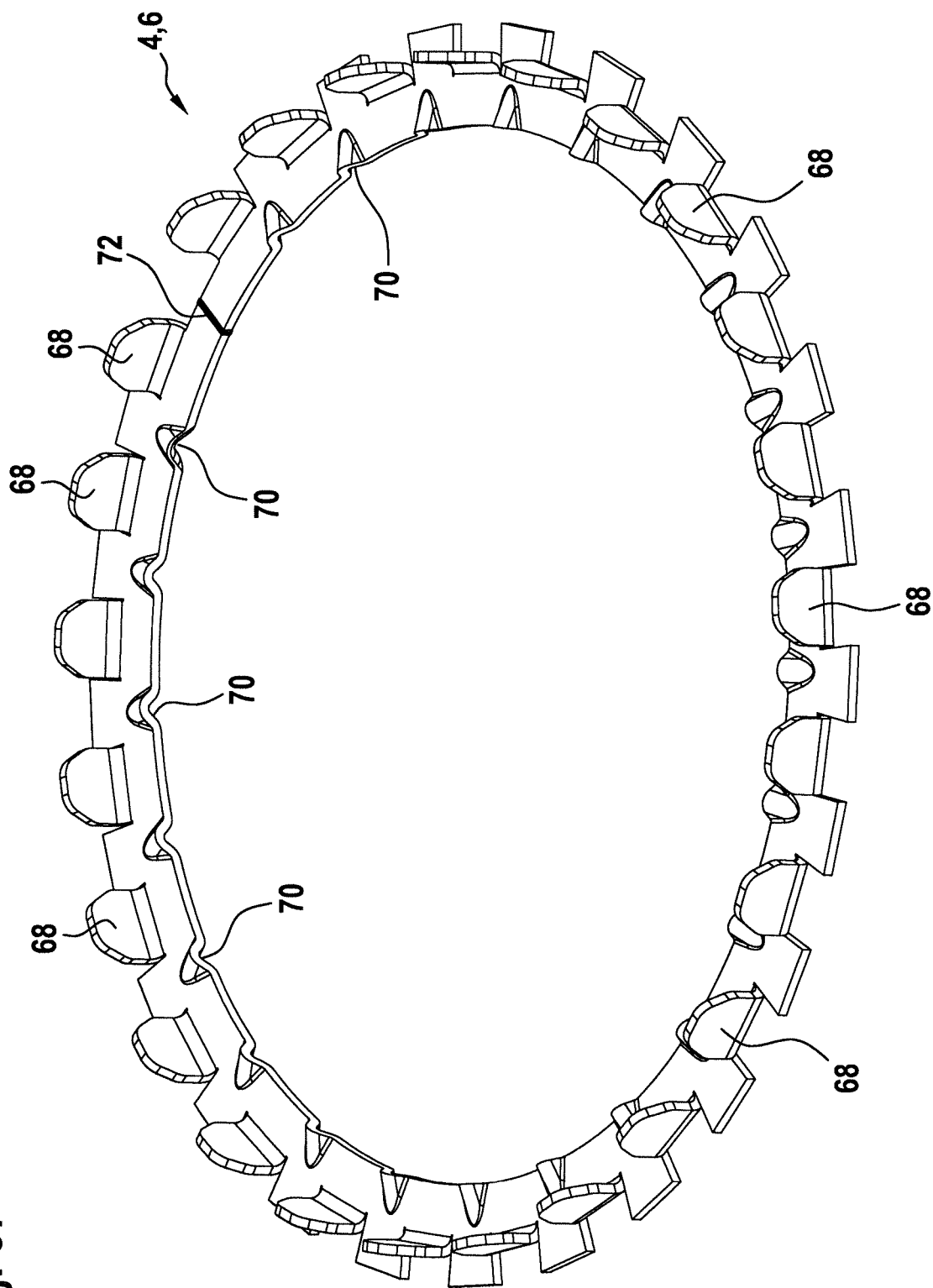
Figure 58:
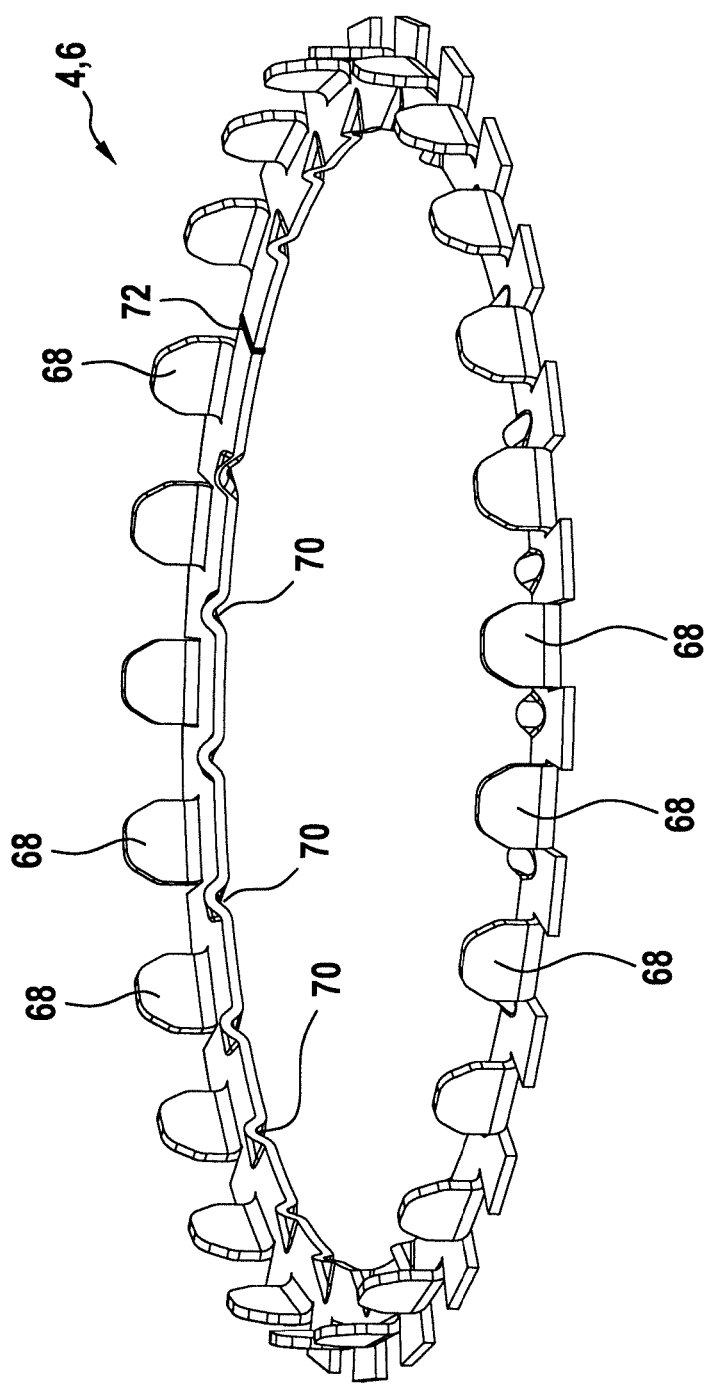

FIG. 4;

FIG. 6 shows a plan view of the sheet-metal strip in the first embodiment, indicating the target ring shape in dash-dotted lines;

FIG. 7 shows a detail view VII of FIG. 6 in an enlarged scale;

FIG. 8 shows a side view of the longitudinal side of the sheet-metal strip of FIG. 6;

FIG. 9 shows a detail view IX of FIG. 8 in an enlarged scale;

FIG. 10 shows a perspective view of the sheet-metal strip in the first embodiment as seen from below;

FIG. 11 shows a perspective view of the supporting ring in the first embodiment;

FIG. 12 shows a plan view of the sheet-metal strip in a second embodiment, with the target ring shape being indicated in dash-dotted lines;

FIG. 13 shows a detail view XIII of FIG. 12 in an enlarged scale;

FIG. 14 shows a side view of the longitudinal side of the sheet-metal strip of FIG. 12;

FIG. 15 shows a detail view XV of FIG. 14 in an enlarged scale;

FIG. 16 shows a plan view of the sheet-metal strip in a third embodiment;

FIG. 17 shows a side view of the longitudinal side of the sheet-metal strip of FIG. 16;

FIG. 18 shows a plan view of a section of the sheet-metal strip in the third embodiment, with folded longitudinal side;

FIG. 19 shows a side view of the transverse side of the sheet-metal strip of FIG. 18;

FIG. 20 shows a perspective view of the sheet-metal strip in the third embodiment as seen from below;

FIG. 21 shows a perspective view of the supporting ring in the third embodiment;

FIG. 22 shows a plan view of the sheet-metal strip in a fourth embodiment, with the target ring shape being indicated in dash-dotted lines;

FIG. 23 shows a side view of the longitudinal side of the sheet-metal strip of FIG. 22;

FIG. 24 shows a detail view XXIV of FIG. 23 in an enlarged scale;

FIG. 25 shows a perspective view of the sheet-metal strip in the fourth embodiment, as seen from below;

FIG. 26 shows a perspective view of the supporting ring in the fourth embodiment;

FIG. 27 shows a perspective view of a supporting ring from a sheet-metal strip in a fifth embodiment, as seen from above;

FIG. 28 shows a perspective view of the supporting ring from the sheet-metal strip in the fifth embodiment, as seen from below;

FIGS. 29 to 32 show various perspective detail views of the supporting ring of FIGS. 27 and 28;

FIG. 33 shows perspective views of sheet metal sections in the fifth embodiment in the form of a blank;

FIG. 34 shows perspective views of the sheet metal sections of FIG. 35 with a fold created on a longitudinal side of the sheet-metal strip;

FIGS. 35 to 38 show various views of a sheet-metal strip in a sixth embodiment;

FIG. 39 shows a perspective view of a supporting ring formed from the sheet-metal strip of the sixth embodiment;

FIGS. 40 to 43 show various views of a sheet-metal strip in a seventh embodiment;

FIG. 44 shows a perspective view of a supporting ring formed from the sheet-metal strip of the seventh embodiment;

FIGS. 45 to 48 show various views of a sheet-metal strip in an eighth embodiment;

FIG. 49 shows a perspective view of a supporting ring formed from the sheet-metal strip of the eighth embodiment;

FIGS. 50 to 53 show various views of a sheet-metal strip in a ninth embodiment;

FIG. 54 shows a perspective view of a supporting ring formed from the sheet-metal strip of the ninth embodiment;

FIG. 55 shows a plan view of the sheet-metal strip in a tenth embodiment;

FIG. 56 shows a perspective view of the sheet-metal strip of FIG. 55; and FIGS. 57 and 58 show perspective views of a supporting ring formed from the sheet-metal strip of the tenth embodiment.

The drawings are merely of schematic nature and serve only for the understanding of the invention. Like elements are provided with the same reference numerals.

Features of the individual embodiments can also be realized in other embodiments. Thus, they are mutually exchangeable.

Figure 1:
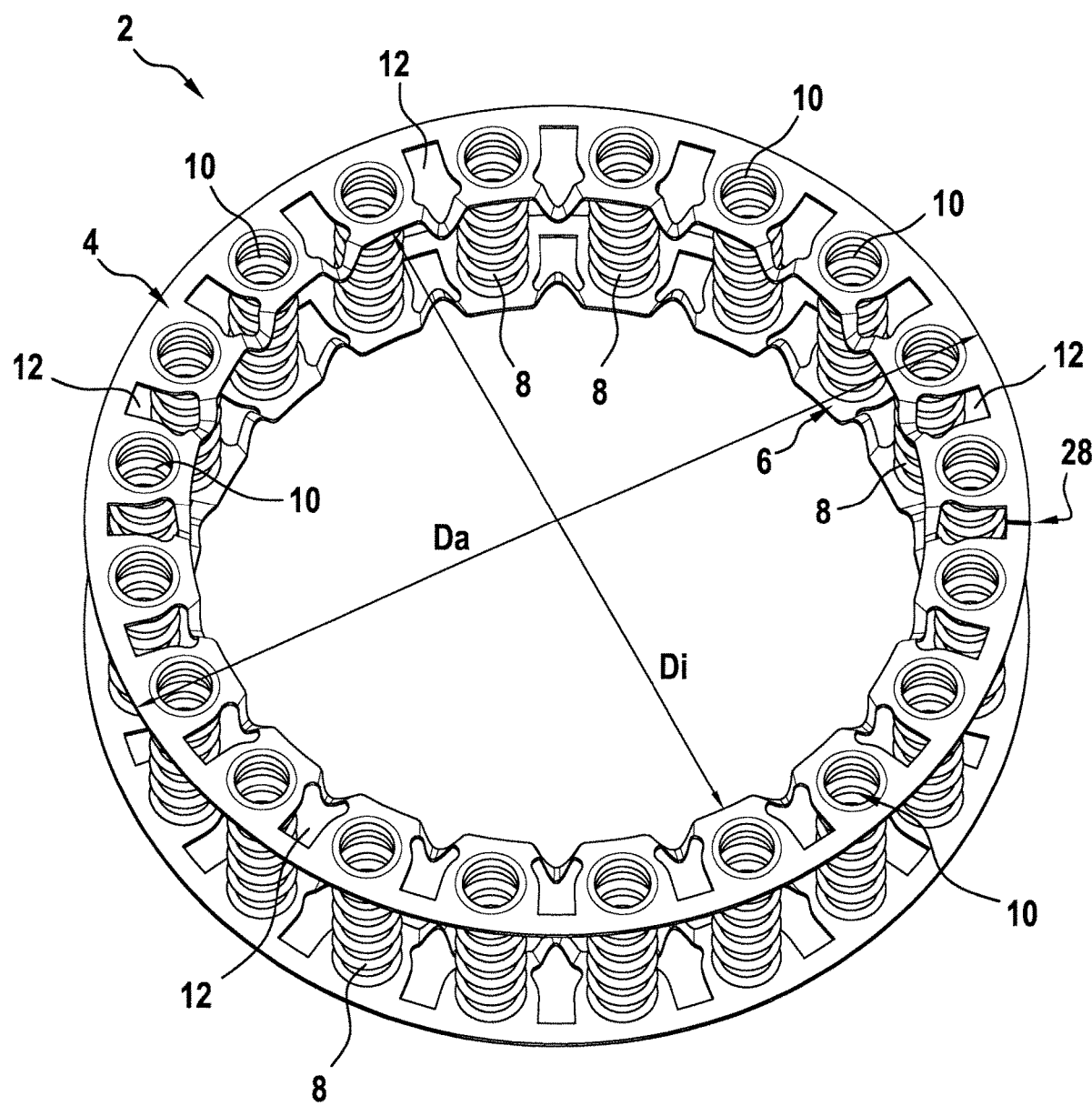
FIG. 1 shows a perspective view of a first embodiment of a spring package according to the invention.

FIG. 1 shows an inventive spring package 2 in a first exemplary embodiment. The spring package 2 comprises a first supporting ring 4, a second supporting ring 6 and a plurality of coil springs 8 arranged between the first and the second supporting rings 4, 6.

The coil springs 8 may be formed as tension or compression spring and in the embodiment illustrated here are uniformly distributed along the circumference of the two supporting rings 4, 6 and arranged spaced apart from each other. Furthermore, it can be seen that the supporting rings 4, 6 have a circular opening 10 in alignment with the central axis of each coil spring 8. Between two such adjacent circular openings 10, recesses 12 can be seen, which will be described in more detail with reference to subsequent figures.

Figure 2:
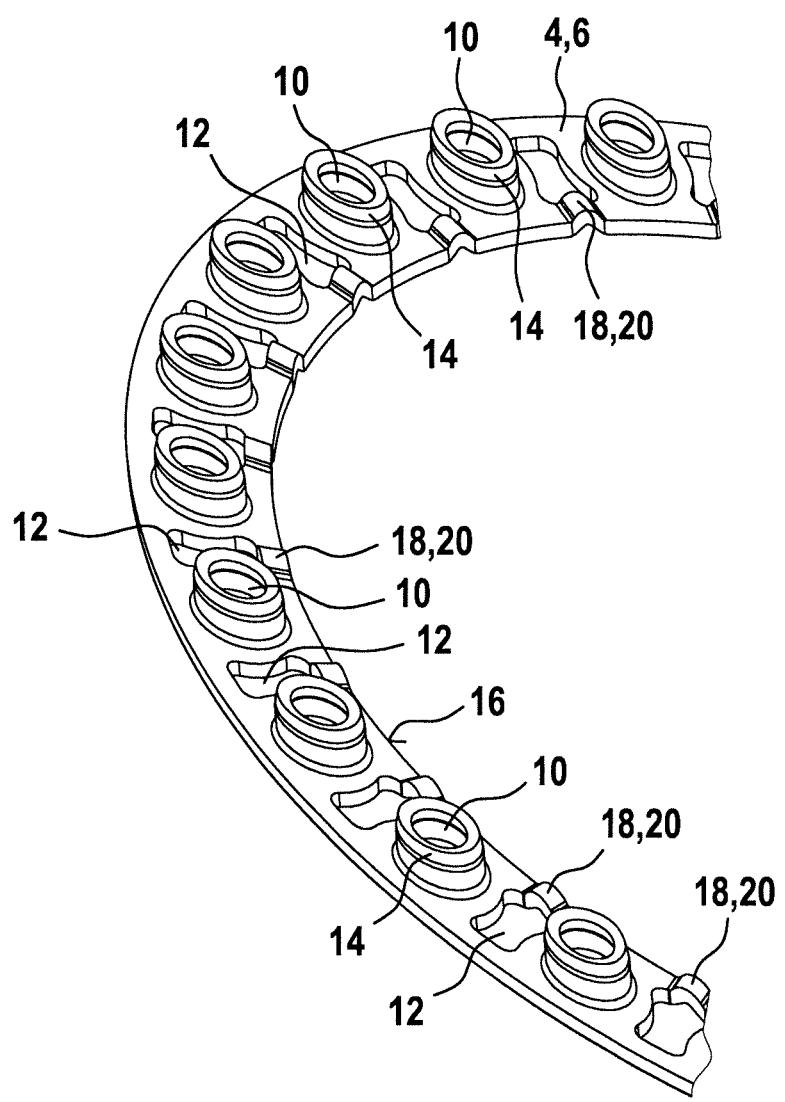
FIG. 2 shows a perspective partial view from a side of a supporting ring in a first embodiment.
Figure 3:
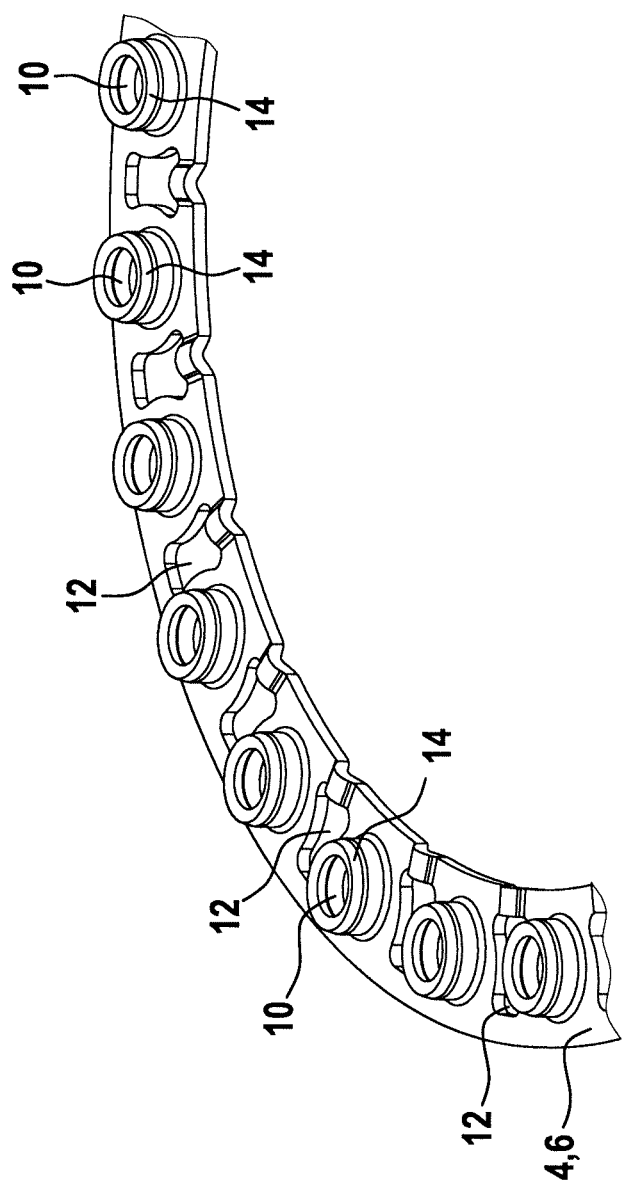
FIG. 3 shows a further perspective partial view analogous to FIG. 2 in an enlarged scale.

FIGS. 2 and 3 show one of the supporting rings 4, 6 from the side facing the coil springs 8 in the spring package 2 (see FIG. 1). It can be seen here that the circular openings 10 have a continuous circumferential edge 14 extending in the axial direction and facing the coil springs 8 in the assembled state. The circumferential edge 14 serves for positioning and fixing the position of the coil springs 8 and is also referred to as spring pin.

It can be seen in FIGS. 1 to 3 that the recesses 12 in the ring shape, i.e. in the form as supporting ring 4, 6, have a connecting web 18 on the ring inner side 16 or on the inner diameter Di, which is formed like a nose or shoulder in the ring shape and projects in the axial direction of the supporting ring 4, 6. In the spring package, the shoulder or nose 20 of the connecting web 18 faces the coil springs 8 (see FIG. 1).

Figure 4:
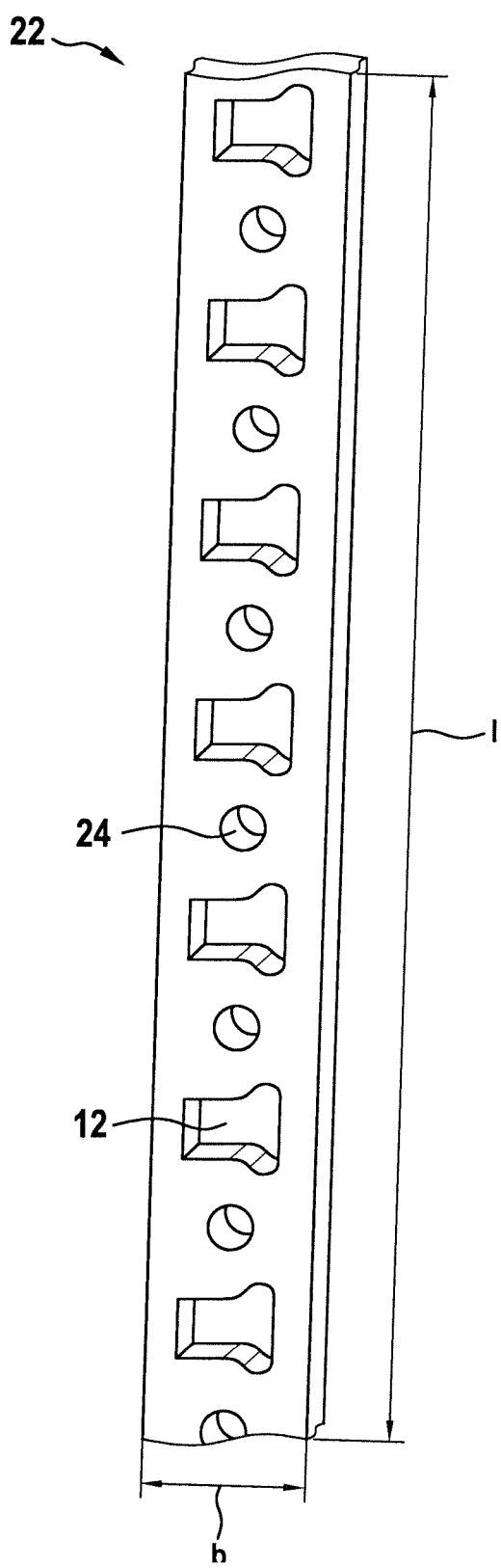
FIG. 4 shows a plan view of a section of a sheet-metal strip from which the supporting ring is formed in the first embodiment.
Figure 5:
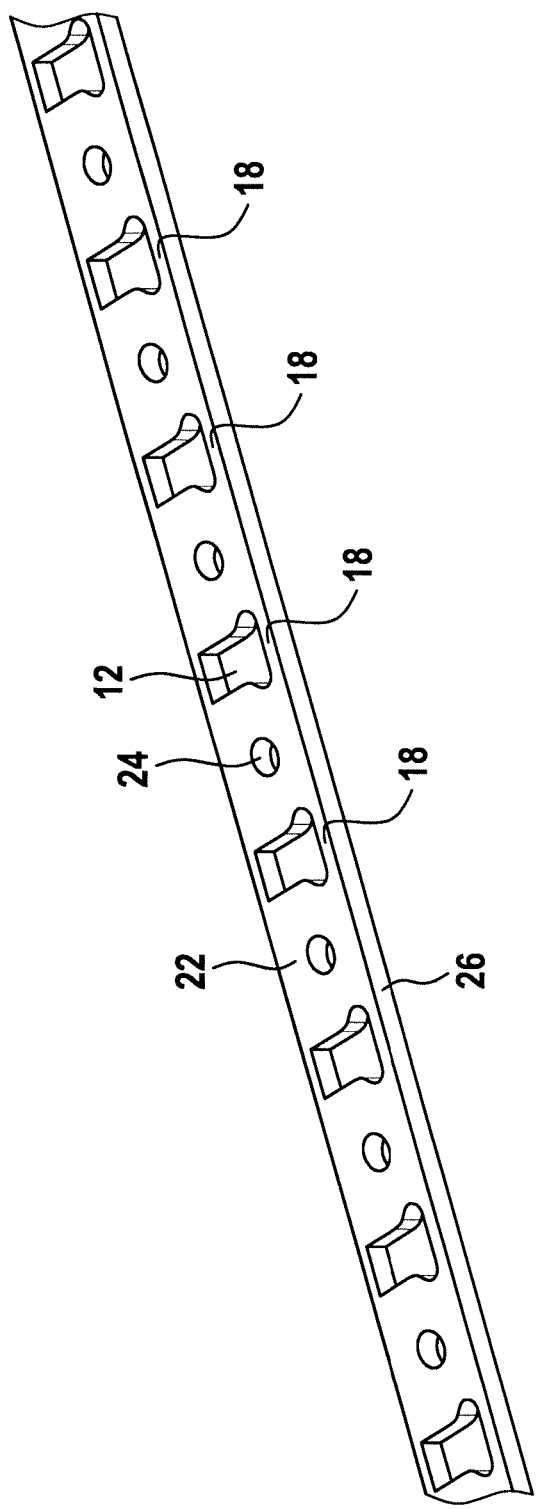

FIGS. 4 and 5 show a stamped sheet-metal strip 22 serving as initial component, so to speak as blank, for the supporting ring 4, 6. The term sheet-metal strip is to be understood here as a strip of metal material which has an elongated shape, i.e. its length l is significantly greater than its width b. The length l of the sheet-metal strip 22 is predetermined and corresponds to the circumference of the desired outer diameter Da of the supporting ring 4, 6 (see FIG. 1). Referring back to FIGS. 4 and 5, it can be seen that the sheet-metal strip 22 already has openings 24 and the recesses 12 prior to bending into the ring shape, which are arranged in alternating manner along the longitudinal direction of the sheet-metal strip 22. The openings 24 are still significantly smaller than the circular openings 10. The openings 24 are usually widened before bending, so that the circular openings 10 are formed with the circumferential, projecting edge 14, i.e. the spring pins. If the recesses 12 are formed already in the stamping operation of the sheet-metal strip 22 or at least prior to bending of the sheet-metal strip 22 into the ring shape, the recesses 12 may also be referred to as stamped windows.

In the embodiment illustrated here, the recesses 12 are formed in anvil-like manner.

However, other similar shapes are conceivable as well, of which a selection will be explained below with reference to other embodiments. Furthermore, it can be seen that the connecting web 18 is formed on a longitudinal edge 26 of the sheet-metal strip 22, which corresponds to the future ring inner side 16. However, the connecting web 18 is still flat here and still has no projecting nose- or shoulder-like geometry.

The noses or shoulders 20 of the connecting web 18 are not formed before the sheet-metal strip 22 is formed or bent into one of the supporting rings 4, 6. For this purpose, predetermined impressions are introduced, which effect the formation of the noses or shoulders 20 and thus a "shortening" of the longitudinal edge 26, thereby creating the annular shape for the supporting ring 4, 6. Therefore, the connecting webs 18 and the noses 20 may also be referred to as bending ribs 19.

Upon creating the annular or ring shape, the two end edges (the edges having the width b of the sheet-metal strip 22) are joined together by a suitable method. In FIG. 1, it can be seen as an example that the two end edges were welded together (shown in FIG. 1 on the right in the picture). The welded connection is provided with reference numeral 28.

FIGS. 6 to 11 show various illustrations of the first embodiment of the supporting ring 4, 6, with FIG. 6 showing a plan view of the sheet-metal strip 22 and indicating the target ring shape in dash-dotted lines. FIG. 7 shows an enlarged view of the detail VII of FIG. 6. FIG. 8 shows a side view of the sheet-metal strip 22 in the first embodiment, and FIG. 9 shows an enlarged view of the detail IX of FIG. 8. FIG. 10 illustrates the sheet-metal strip 22 in a perspective view with the flat surface, i.e. the side directed away from the springs 8, facing upward, and FIG. 11 illustrates the supporting ring 4, 6 formed accordingly from the sheet-metal strip 22 of the first embodiment in a perspective view as well.

The sheet-metal strip 22 has the length l and the width b, and across the entire length l there are arranged the circular openings 10 with the edges 14, also referred to as spring pins or spring nozzles, in uniformly spaced apart manner. As an example, there are 20 spring pins shown here (see also FIG. 8).

In the first embodiment of the sheet-metal strip 22, the recesses 12 are formed like anvils anvil-shaped, with the corners being rounded by radii r1, r2, r3 in order to reduce the stresses caused by sharp corners (see FIG. 7). The wider side of the anvil shape is in this case formed on the longitudinal edge 26 of the sheet-metal strip 22, with the material arranged between the longitudinal edge 26 and the recess 12 corresponding to the connecting web 18.

FIG. 8 illustrates the sheet-metal strip 22 from the side, so that the edge 14 of the circular openings 10 is clearly visible. In the area of the detail IX, there is indicated a coil spring 8 to illustrate how said spring 8 abuts on the edge 14 in the assembled spring package 2. This area is shown enlarged in FIG. 9. It can be seen that the edge 14 projects from a surface 30 of the sheet-metal strip 22 with a height h. First, it extends at least approximately at right angles to the surface 30 and then slightly tapers from a height h1 to the final height h (corresponding to the distance of the height h2). When assembling the spring package 2, the taper facilitates positioning or placing the coil springs 8 on the spring pins. Furthermore, the transitions are provided with radii as well to minimize the stresses occurring.

Between two spring pins, there is indicated a bead 32 (broken line) which is created on the ring inner side 16 when the sheet-metal strip 22 is being formed into the ring shape of the supporting ring 4, 6 and corresponds to the the nose or shoulder 20 of the connecting web 18 or bending rib 19.

With reference back to FIG. 6, the desired ring shape or the target ring shape for the supporting ring 4, 6 can be recognized by dash-dotted lines. There are three diameters indicated: the outer diameter Da, the inner diameter Di and a diameter Dm which corresponds to the diameter at half of the ring width. Furthermore, the assumed neutral fiber nF for the sheet-metal strip 22 is illustrated. The neutral fiber, which may also be referred to as zero line, is the fiber or layer whose length does not change during bending, and thus is the location where the load, i.e. the bending, does not cause tensile or compressive stress.

FIG. 11 illustrates the connecting location or junction 23 of the two ends of the sheet-metal strip 22. At the connecting location 23, the two ends, for example, are welded together or glued or clinched or otherwise permanently connected to each other.

FIGS. 12 to 15 illustrate a second exemplary embodiment of the sheet-metal strip 22, which is mainly identical with the first embodiment, so that only the differences will be discussed in the following.

In the second exemplary embodiment, the recesses 12 are rectangular (see FIGS. 12 and 13). Here too, the corners are provided with a radius r4 to minimize the stresses occurring there.

The shape of the edges 14 of the openings 10, or the spring pins, corresponds to the shape in the first embodiment. Again, when bending the sheet-metal strip 22 into the ring shape, a bead 34 is formed on the ring inner side 16, which corresponds to the nose- or shoulder-like connecting web 18.

FIGS. 16 and 21 show a third exemplary embodiment of the sheet-metal strip 22, wherein FIG. 16 shows the sheet-metal strip 22 in a plan view, as it is usually present after the stamping operation. FIG. 17 shows a side view of the sheet-metal strip 22 shown in FIG. 16. FIG. 18 shows the sheet-metal strip 22 (shortened) in a plan view after a longitudinal side of the sheet-metal strip 22 has been folded, and FIG. 19 shows a side view of the shorter edge of the sheet-metal strip 22 of FIG. 18. FIG. 20 shows a perspective view of the sheet-metal strip 22, with the surface (as supporting ring 4, 6) directed away from the coil springs 8 facing upwardly, and FIG. 21 illustrates the supporting ring 4, 6 formed from this sheet-metal strip 22.

The biggest difference to the embodiments described so far is that the recesses 12 do not have a closed contour, but an open contour. The recesses 12 of this third embodiment are additionally provided with reference numeral 36. The recesses 36 are pin-like and extend from the longitudinal edge 26 corresponding to the future circumference of the inner diameter Di of the ring initially in rod-like manner in the direction towards the center of the sheet-metal strip and there change into a circular shape, with the center M being located on the longitudinal symmetry line of the sheet-metal strip 22, which in the instant case also corresponds to the assumed neutral fiber nF.

Another difference from the first and second embodiments is that the sheet-metal strip 22, at the longitudinal edge 38 thereof corresponding to the future circumference of the outer diameter Da, has a fold 40 (see FIG. 18 and FIG. 19 as well as FIG. 21), which projects from the surface 30 of the sheet-metal strip 22 in substantially the same direction as the edge 14 of the openings 10 (see FIG. 19). Such a fold 40, which substantially corresponds to a bent sheet-metal edge, locally increases the rigidity of the component in the region in which it is arranged. In the form bent into a supporting ring 4, 6, the fold 40 additionally provides a reinforcement of the entire supporting ring 4, 6. In the embodiment shown here, there are no bending ribs 19 created during the bending operation, since the recesses 12 form open, quasi-slotted geometries. Alternatively, it is also conceivable that the sheet-metal strip 22 of the third embodiment is formed into a supporting ring 4, 6 such that the recesses 12 are open towards the outer peripheral edge of the supporting ring 4, 6 and the fold 40 is arranged on the inner peripheral edge of the supporting ring 4, 6.

FIGS. 22 to 26 illustrate a fourth exemplary embodiment, which is again very similar to the first and second embodiments. Therefore, once more only the essential differences will be discussed in the following.

An essential difference from the embodiments illustrated so far is that the fourth embodiment shown here has no recesses between the openings 10 with the edge 14 (see FIG. 22 and FIG. 25). As a result, the position of the neutral fiber nF is shifted towards the longitudinal edge 38 (see FIG. 22).

FIG. 24 shows the detail XXIV of FIG. 23 in enlarged scale. Here too, a bead 42 is indicated by dashed lines, which corresponds more or less to the bending rib 19, as it is created during the bending operation (see also FIG. 26). In FIG. 26, the bead 42 is formed to open into the ring inner side 16. However, there is also conceivable an embodiment which is formed from the sheet-metal strip 22 of the fourth embodiment in which, in forming the sheet-metal strip 22 into the ring shape, the bead 42 opens into the ring outer side 44 (instead of the ring inner side 16).

FIG. 26 indicates the connecting location 45 of the two ends of the sheet-metal strip 22. At the connecting location 45, the two ends, for example, are welded together or glued or clinched or otherwise permanently connected to each other FIGS. 27 to 32 illustrate an exemplary fifth embodiment, which is shown here already in the ring shape as a supporting ring 4, 6.

In contrast to the supporting ring 4, 6 of the first embodiment shown in FIG. 1, the supporting ring 4, 6 has a first recess 46 which is open towards the outside diameter Da or the ring outer side 44 and is slightly V-shaped. In addition, the supporting ring 4, 6, on the side of the inner diameter Di or the ring inner side 16, has a second recess 48 which has a closed contour and forms a connecting web 50. However, this connecting web 50 is folded together with the entire ring inner side 16, i.e. bent at angle of substantially 90°. This means that the supporting ring 4, 6 in the fifth embodiment has a continuous circumferential fold 52 on the ring inner side 16.

In conformity with all all other embodiments shown so far, the recesses 46, 48 are each formed between two circular openings 10 having the edge 14. The fold 52 and thus also the connecting web 50 extend in substantially the same direction as the edge 14. Between two circular openings 10, there are always present both a first recess 46 and a second recess 48.

Figure 29:
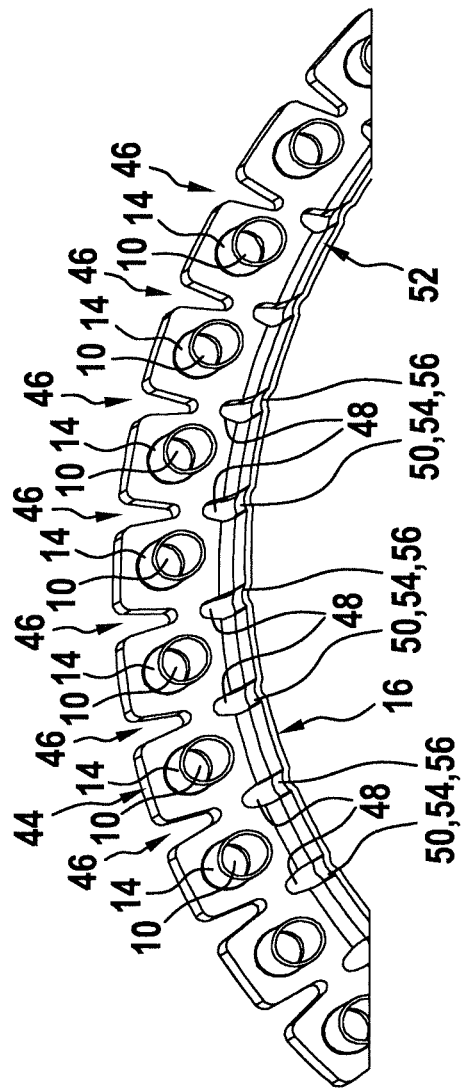
Figure 30:
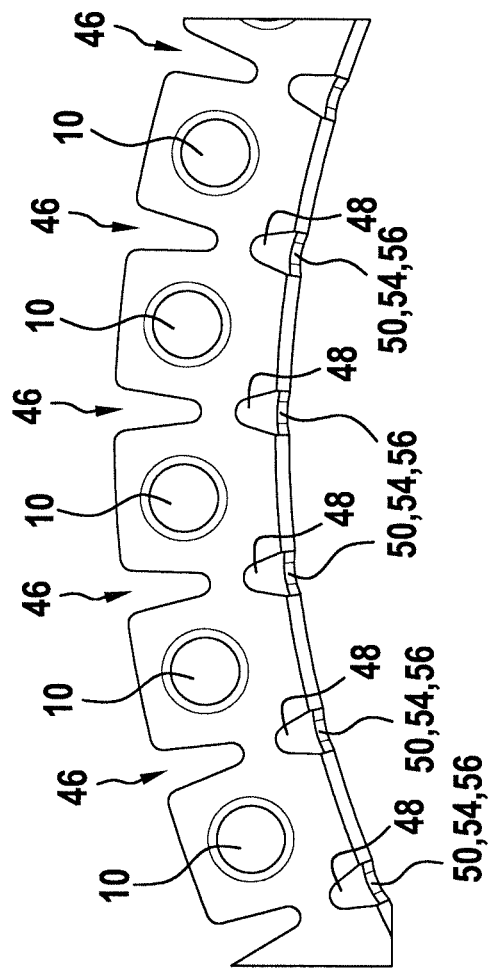
Figure 31:
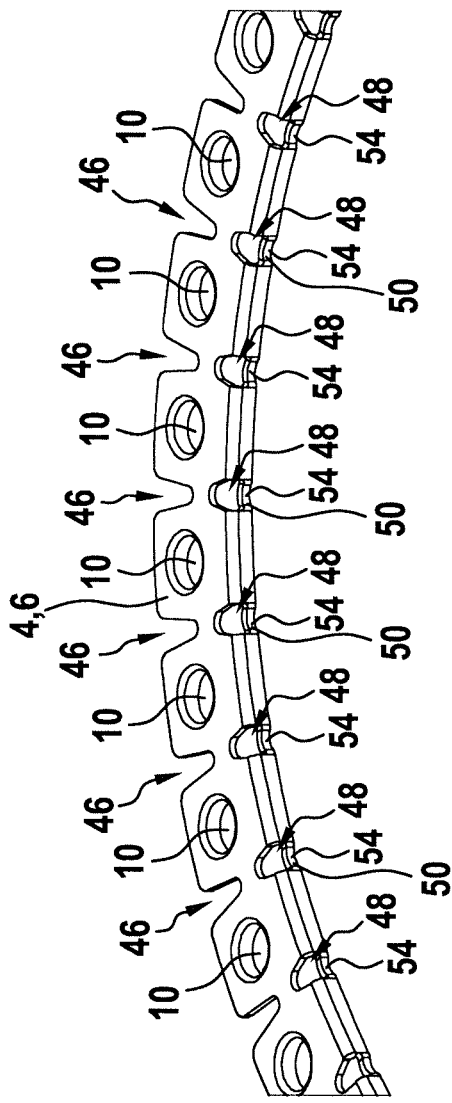
Figure 32:
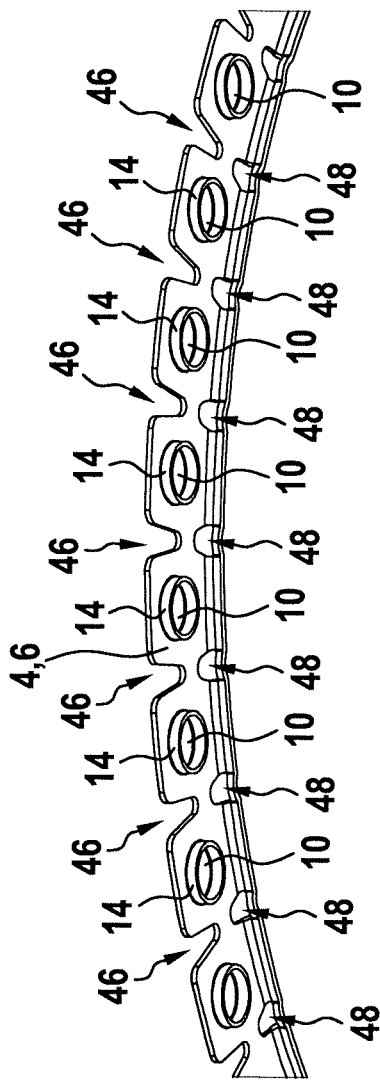

It can be seen in particular in FIGS. 29 and 30 that the connecting web 50 has a small protrusion 54 extending radially outwardly. This protrusion 54 is comparable to the beads, 32, 34 and 42, respectively, and is created by bending of the sheet-metal strip 22 into the ring shape. Therefore, the protrusion 54 may also be referred to as bending rib 56.

FIGS. 33 and 34 show sections of the sheet-metal strip 22 in the fifth embodiment, with FIG. 33, illustrating the sheet-metal strip 22 as it is present after the stamping operation and FIG. 34 illustrating the sheet-metal strip 22 after a longitudinal edge (the subsequent ring inner side 16) has been bent and thus has the fold 52.

FIGS. 35 to 44 show various illustrations of a sixth (FIGS. 35 to 39) and seventh (FIGS. 40 to 44) embodiment, which correspond substantially to the first embodiment, with the sole difference from the first embodiment being that a longitudinal edge of the sheet-metal strip 22 is folded before the bending operation and thus has a fold 58. As a result, the openings 10 and the recesses 12, as seen in the width direction of the sheet-metal strip, are no longer arranged centrally, but are slightly shifted towards a longitudinal edge of the sheet-metal strip 22.

The difference between the sixth and the seventh embodiment is that the fold 58 in this case is located once on the ring inner side 16 of the supporting ring 4, 6 and there forms an inner collar 60 and bending ribs 62 are formed on the ring outer side 44 (sixth embodiment, see FIG. 39). In the seventh embodiment, the fold 58 is disposed on the ring outer side 44 of the supporting ring 4, 6 and thus forms an outer collar 64, and the bending ribs 62 are formed on the ring inner side 16 (see FIG. 44).

FIGS. 45 to 54 show various illustrations of an eighth (FIGS. 45 to 49) and a ninth (FIGS. 50 to 54) embodiment, which substantially correspond to the fourth embodiment illustrated, with the sole difference from the fourth embodiment being that one longitudinal edge of the sheet-metal strip 22 is folded before the bending operation and thus has a fold 58. As a result, the openings 10 and the recesses 12, as seen in the strip width direction of the sheet-metal strip, are no longer centrally located, but are slightly shifted towards a longitudinal edge of the sheet-metal strip 22.

The difference between the eighth and the ninth embodiment is that the fold 58 is arranged once on the ring inner side 16 of the supporting ring 4, 6 and there forms an inner collar 60 and bending ribs 62 are formed in the form of beads 66 on the ring outer side 44 (eighth embodiment, see FIG. 49). In the ninth embodiment, the fold 58 is arranged on the ring outer side 44 of the supporting ring 4, 6 and thus forms an outer collar 64, and the bending ribs 62 or beads 66 are formed on the ring inner side 16 (see FIG. 54).

FIGS. 55 to 58 illustrate a tenth embodiment of the sheet-metal strip 22, with FIG. 55 showing a plan view of the sheet-metal strip 22, while FIG. 56 shows the sheet-metal strip 22 in a perspective view. FIGS. 57 and 58 each show perspective views of a supporting ring 4, 6 formed from the sheet-metal strip 22 of the tenth embodiment.

The essential difference from the embodiments shown so far consists in that the sheet-metal strip 22 no longer has recesses 12 and openings 10. Instead of the openings 10 serving as spring pins, there are provided tabs or spring tabs 68 in this embodiment, which—similar to the spring pins—are arranged within a coil spring to hold the same in its position in the assembled spring package 2.

To this end, the sheet-metal strip 22 has tongue-like tabs 68, which are initially flat, but their contours are already stamped or cut to about the center line of the longitudinal symmetry of the sheet-metal strip 22, so that the tabs 68 can be bent in a subsequent step so as to project from the sheet-metal strip 22 at an angle of about 90°. Subsequently, the sheet-metal strip 22 is brought into the ring shape which, in the embodiment shown, has the result that beads 70 will be formed on the ring inner side 16.

In FIG. 57, the connecting location or junction 72 of the two ends of the sheet-metal strip 22 can be seen. At the junction 72, the two ends are, for example, welded together or glued or clinched or otherwise permanently connected to each other.

LIST OF REFERENCE NUMERALS 2 spring package
4 first supporting ring
6 second supporting ring
8 coil spring
10 circular opening
12 recess
14 edge
16 ring inner side
18 connecting web
19 bending rib
20 nose/shoulder
22 sheet-metal strip
23 connecting location
24 opening
26 longitudinal edge
30 welded connection
30 surface
32 bead
34 bead
36 recess
38 longitudinal edge
40 fold
42 bead
44 ring outer side
45 connecting location
46 first recess
48 second recess
50 connecting web
52 fold
54 protrusion
56 bending rib
58 fold
60 collar
62 bending rib
64 collar
66 bead
68 tab
70 bead
72 connecting location
l length
b width
Di inner diameter
Da outer diameter
Dm diameter of half of the ring width
NF assumed neutral fiber
M center

The invention claimed is:

1. A spring package (2) for use in a clutch and/or in a transmission, comprising:
   supporting rings (4; 6) including a first supporting ring (4) and a second supporting ring (6) which is arranged axially spaced apart from the first supporting ring (4), and
   a plurality of coil springs (8) arranged between the first supporting ring (4) and the second supporting ring (6) in a distributed manner across the circumference thereof,
   wherein both supporting rings (4; 6) comprise a stamped and bent sheet-metal strip (22) having a ring shape and have ends that are permanently connected to each other, respectively;
   wherein the ends of the stamped and bent sheet metal strip (22) are welded together, glued, clinched or otherwise permanently connected to each other;
   wherein both supporting rings (4; 6) have recesses distributed across the circumference thereof;
   wherein both supporting rings (4; 6) have an ring inner side (16) and an ring outer side (44), respectively, and the ring inner side (16) has a circumferential edge (52) projecting in an axial direction of the spring package (2); and
   wherein the recesses are formed as one or more of first recesses (46) without tabs provided at the ring outer side (44) and open towards the ring outer side (44), and second recesses (48) at the ring inner side (16) having a closed contour and forming a connecting web (50).

2. The spring package (2) according to claim 1, wherein at least one of the supporting rings (4; 6) has spring holders distributed across its circumference for positioning one each of the coil springs (8).

3. The spring package (2) according to claim 2, wherein the spring holders are formed as substantially circular openings (10) having a projecting circumferential edge (14), or as cup-shaped protrusions.

4. The spring package (2) according to claim 1, wherein the first and second recesses (46, 48) are arranged between two circular openings (10) each.

* * * * *